United States Patent
Kiyamura

(10) Patent No.: US 9,904,071 B2
(45) Date of Patent: Feb. 27, 2018

(54) IMAGE BLUR CORRECTION DEVICE CAPABLE OF PREVENTING OCCURRENCE OF IMAGE BLUR, LENS BARREL, AND IMAGE PICKUP APPARATUS

(71) Applicant: CANON KABUSHIKI KAISHA, Tokyo (JP)

(72) Inventor: Kousuke Kiyamura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/229,592

(22) Filed: Aug. 5, 2016

(65) Prior Publication Data
US 2017/0046818 A1    Feb. 16, 2017

(30) Foreign Application Priority Data
Aug. 10, 2015 (JP) .................. 2015-158278

(51) Int. Cl.
G02B 27/64    (2006.01)
H04N 5/225    (2006.01)
H04N 5/232    (2006.01)

(52) U.S. Cl.
CPC ......... G02B 27/646 (2013.01); H04N 5/2254 (2013.01); H04N 5/23287 (2013.01)

(58) Field of Classification Search
CPC . G02B 27/646; H04N 5/23287; H04N 5/2254
See application file for complete search history.

(56) References Cited

U.S. PATENT DOCUMENTS

| | | | |
|---|---|---|---|
| 7,650,065 B2* | 1/2010 | Takahashi | H04N 5/23248 359/556 |
| 8,625,022 B2* | 1/2014 | Nakayama | H04N 5/23258 348/357 |
| 2006/0043824 A1* | 3/2006 | Sakano | G02B 7/102 310/323.09 |
| 2006/0285840 A1* | 12/2006 | Takahashi | H04N 5/23258 396/55 |
| 2007/0031134 A1* | 2/2007 | Kuroda | G02B 13/0035 396/55 |
| 2009/0225177 A1* | 9/2009 | Maeda | G02B 27/646 348/208.99 |
| 2010/0171392 A1* | 7/2010 | Mukae | H04N 5/23264 310/328 |

(Continued)

FOREIGN PATENT DOCUMENTS

JP    2008-220031 A    9/2008

*Primary Examiner* — Jason Flohre
(74) *Attorney, Agent, or Firm* — Cowan, Liebowitz & Latman, P.C.

(57) ABSTRACT

An image blur correction device capable of effectively preventing occurrence of image blur with a simple configuration. A movable member holds a correction lens. A first drive section moves the movable member in a first direction orthogonal to a direction of an optical axis of the correction lens, and a second drive section moves the movable member in a second direction orthogonal to the direction of the optical axis. The first drive section includes a first vibrator unit and a first slider fixed to the movable member and in contact with the first vibrator. The second drive section includes a second vibrator unit and a second slider. When viewed in a direction of the optical axis, the first and second drive sections at least partially overlap each other.

12 Claims, 18 Drawing Sheets

(56) References Cited

U.S. PATENT DOCUMENTS

| | | | | |
|---|---|---|---|---|
| 2011/0176012 A1* | 7/2011 | Yagisawa | ............ | G02B 27/646 348/208.2 |
| 2012/0250155 A1* | 10/2012 | Kiyamura | ................ | G03B 5/00 359/554 |
| 2014/0139695 A1* | 5/2014 | Kawai | ................ | H04N 5/23248 348/208.99 |

* cited by examiner

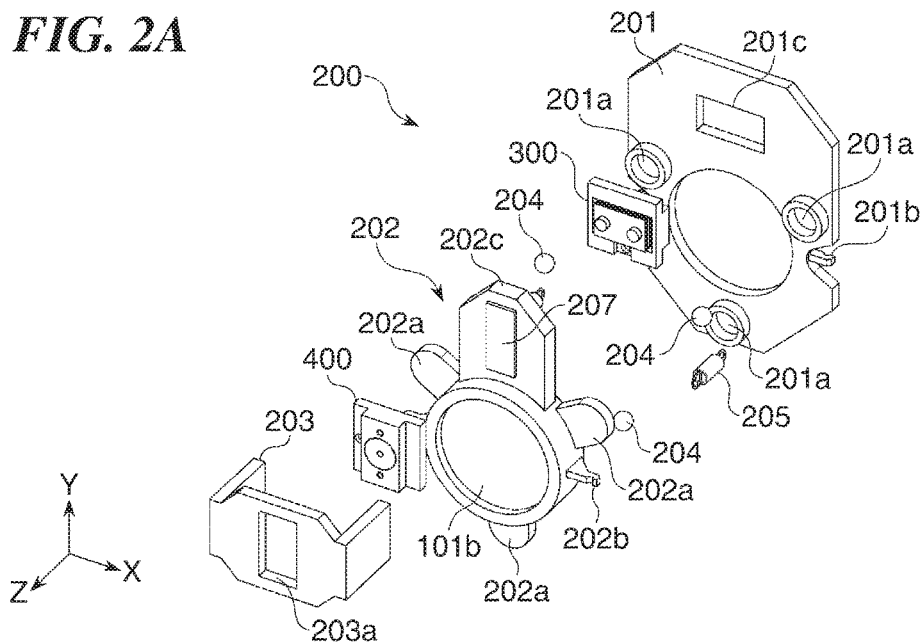
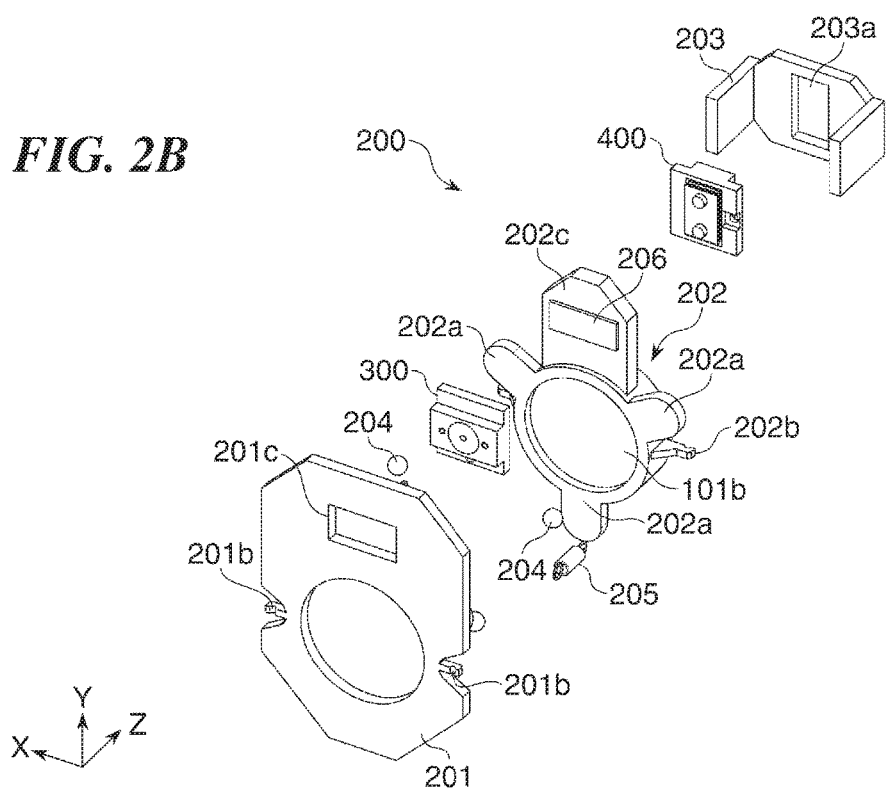

IMAGE BLUR CORRECTION DEVICE CAPABLE OF PREVENTING OCCURRENCE OF IMAGE BLUR, LENS BARREL, AND IMAGE PICKUP APPARATUS

BACKGROUND OF THE INVENTION

Field of the Invention

The present invention relates to an image blur correction device provided in a lens barrel of an image pickup apparatus, such as a digital camera, a lens barrel provided with the image blur correction device, and an image pickup apparatus.

Description of the Related Art

Among image pickup apparatuses, such as a digital camera, there is one provided with a mechanism for correcting image blur by moving part of an optical system or an image pickup device on a plane orthogonal to an optical axis direction according to a camera shake amount, so as to prevent an object image from being blurred e.g. by a camera shake occurring during shooting.

For example, in Japanese Patent Laid Open Publication No. 2008-220031, there has been disclosed an image blur correction device that moves an image pickup device by a so-called vibratory wave motor on a plane orthogonal to an optical axis direction to thereby correct image blur. The vibratory wave motor used in the image blur correction device disclosed in Japanese Patent Laid-Open. Publication No. 2008-220031 is provided with a vibrator having two protrusions, and causes the extremities of the respective two protrusions to perform elliptic motion to thereby drive a driven element held in pressure contact with the two protrusions in one direction.

More specifically, when directions orthogonal to each other on the plane orthogonal to the optical axis are defined as an X direction and a Y direction, the image blur correction device disclosed in Japanese Patent Laid-Open Publication No. 2008-220031 is provided with an X frame that can move in the Y direction while holding the image pickup device and a fixed member that supports the X frame such that the X frame can be moved in the X direction. The fixed member is formed with a first vibrator for driving the X frame in the X direction, and the X frame is formed with a second vibrator for driving the image pickup device in the Y direction. This makes it possible to move the image pickup device in the X and Y directions and restrict rotation of the image pickup device about the optical axis at the same time.

However, the image blur correction device disclosed in Japanese Patent Laid-Open Publication No. 2008-220031 uses the frame members that can be moved in the X and Y directions, respectively. Therefore, the image blur correction device is large in the number of components and complicated in construction. To solve this problem, it can be envisaged to simplify the construction of the image blur correction device by eliminating the X frame such that the image pickup device is directly driven using a vibrator for driving in the X direction and another vibrator for driving in the Y direction. In this case, however, when one vibrator is driven, a frictional holding force is generated by the other vibrator. For this reason, a moment of force for causing rotation of the image pickup device is generated, which causes undesired rotation of the image pickup device. This brings about a problem that the image quality of a photographed image is degraded.

SUMMARY OF THE INVENTION

The present invention provides an image blur correction device capable of effectively preventing occurrence of image blur with a simplified construction.

In a first aspect of the invention, there is provided an image blur correction device comprising a movable member configured to hold a correction optical element, a first drive section configured to move the movable member in a first direction orthogonal to a direction of an optical axis of the correction optical element, and a second drive section configured to move the movable member in a second direction orthogonal to the direction of the optical axis, wherein the first drive section includes a first vibrator in which predetermined vibration is excited and a first driven element fixed to the movable member and being in contact with the first vibrator, wherein the second drive section includes a driving element and a second driven element, and wherein when viewed in the optical axis direction, the first drive section and the second drive section at least partially overlap each other.

In a second aspect of the invention, there is provided a lens barrel including an image blur correction device, wherein the image blur correction device comprises a movable member configured to hold a correction optical element, a first drive section configured to move the movable member in a first direction orthogonal to a direction of an optical axis of the correction optical element, and a second drive section configured to move the movable member in a second direction orthogonal to the direction of the optical axis, wherein the first drive section includes a first vibrator in which predetermined vibration is excited and a first driven element fixed to the movable member and being in contact with the first vibrator, wherein the second drive section includes a driving element and a second driven element, and wherein when viewed in the optical axis direction, the first drive section and the second drive section at least partially overlap each other, and wherein the correction optical element is an image blur correction lens.

In a third aspect of the invention, there is provided an image pickup apparatus including a lens barrel provided with an image blur correction device, and an image pickup device having a rectangular image forming surface on which a light flux passing through the lens barrel forms an image, wherein the image blur correction device comprises a movable member configured to hold a correction optical element, a first drive section configured to move the movable member in a first direction orthogonal to a direction of an optical axis of the correction optical element, and a second drive section configured to move the movable member in a second direction orthogonal to the direction of the optical axis, wherein the first drive section includes a first vibrator in which predetermined vibration is excited and a first driven element fixed to the movable member and being in contact with the first vibrator, wherein the second drive section includes a driving element and a second driven element, and wherein when viewed in the optical axis direction, the first drive section and the second drive section at least partially overlap each other, and wherein the correction optical element is an image blur correction lens.

According to the invention, it is possible to effectively prevent occurrence of image blur with a simplified construction to thereby prevent degradation of the image quality of a photographed image.

Further features of the present invention will become apparent from the following description of exemplary embodiments (with reference to the attached drawings).

BRIEF DESCRIPTION OF THE DRAWINGS

FIG. 2A is an exploded perspective view of an image blur correction device according to a first embodiment, which is provided in the lens barrel appearing in FIG. 1, as viewed from an object side.

FIG. 2B is an exploded perspective view of the image blur correction device as viewed from an imaging surface side.

DESCRIPTION OF THE EMBODIMENTS

The present invention will now be described in detail below with reference to the accompanying drawings showing embodiments thereof. An image blur correction device according to the invention can be applied to a lens barrel (exchangeable lens) that can be removably attached e.g. to a single-lens reflex digital camera or an image pickup apparatus such as a compact digital camera or a digital video camera integrally provided with a lens barrel. The construction of the image pickup apparatus is not particularly limited, and hence detailed description of the construction of the entire image pickup apparatus is omitted.

Figure 1:
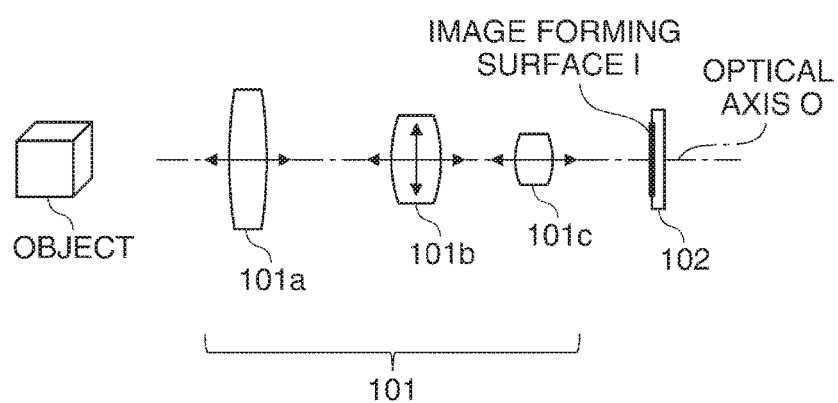
FIG. 1 is a schematic view of an optical system of a lens barrel to which is applied a blur correction device according to embodiments of the invention.

FIG. 1 is a schematic view of an optical system 101 of a lens barrel to which is applied an image blur correction device according to any of the embodiments of the invention. The optical system 101 of the lens barrel has a zoom lens 101a, a correction lens 101b as an image blur correction lens, and a focus lens 101c, arranged in the mentioned order from an object side to an image pickup device side. The construction of the zoom lens 101a and that of the focus lens 101c are well-known, and hence detailed description thereof is omitted.

A light flux having entered the lens barrel from an object passes through the optical system 101 and forms an image on an image forming surface I of the image pickup device 102. At this time, the correction lens 101b is moved by an image blur correction device 200, described hereinafter, on a plane orthogonal to an optical axis O to move an optical image on the image forming surface I, whereby image blur is corrected so as to prevent degradation of the image quality of a photographed image.

Note that the plane orthogonal to the optical axis O is a plane that can be regarded as substantially orthogonal to the optical axis O by considering the dimensional accuracy and the mounting accuracy of various component parts of the lens barrel, and hence it is not required to be precisely orthogonal to the optical axis O in a physical sense.

The image pickup device 102, which is implemented e.g. by a CCD sensor or a CMOS sensor, generates electric signals by performing photoelectric conversion on an optical image formed on the image forming surface I orthogonal to the optical axis O. Note that in an image pickup apparatus body, not shown, equipped with a lens barrel, an image processing circuit and the like provided in the image pickup apparatus body performs predetermined processing on the electric signals output from the image pickup device 102, whereby digital image data is generated.

Figure 3A:
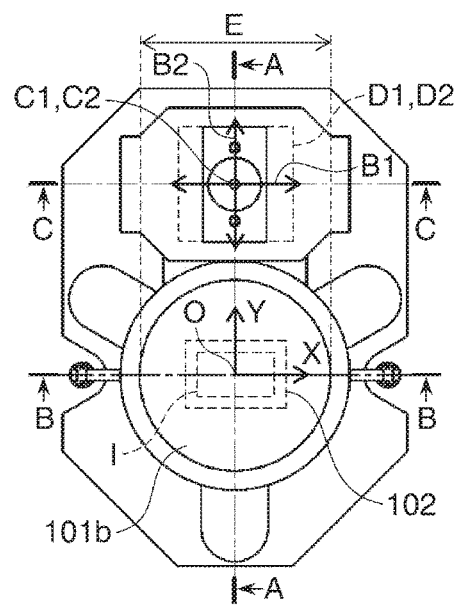
FIG. 3A is a front view of the image blur correction device in a reference position.
Figure 3B:
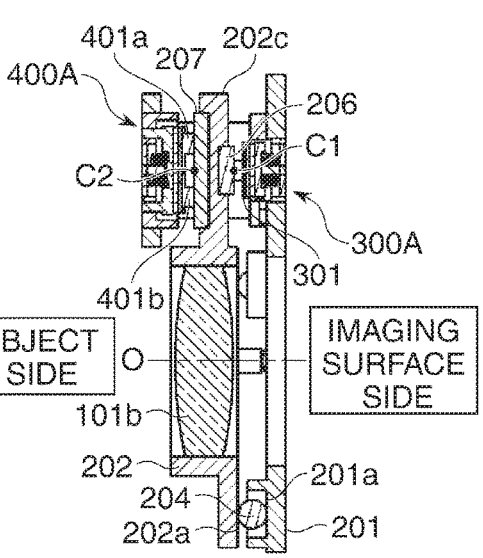
FIG. 3B is a cross-sectional view of the image blur correction device in the reference position.
Figure 3C:
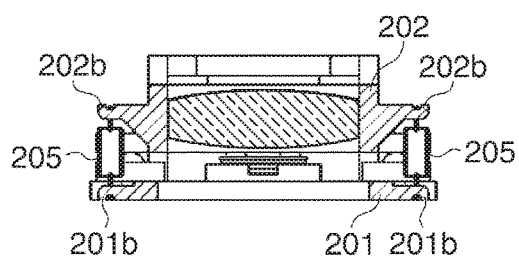
FIG. 3C is another cross-sectional view of the image blur correction device in the reference position.
Figure 3D:
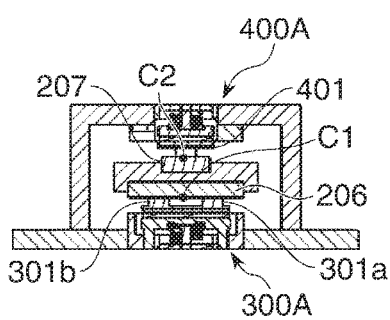
FIG. 3D is still another cross-sectional view of the image blur correction device in the reference position.

FIG. 2A is an exploded perspective view of an image blur correction device 200 according to a first embodiment of the invention, as viewed from an object side, while FIG. 2B is an exploded perspective view of the image blur correction device 200 as viewed from an imaging surface side (image pickup device side). FIG. 3A is a front view (i.e. a view as viewed from the object side) of the image blur correction device 200 in a reference position. FIG. 3B is a cross-sectional view taken as indicated by arrows A-A in FIG. 3A, FIG. 3C is a cross-sectional view taken as indicated by arrows B-B in FIG. 3A, and FIG. 3D is a cross-sectional view taken as indicated by arrows C-C in FIG. 3A. Note that as shown in FIGS. 2A and 2B and FIGS. 3A to 3D, a rightward direction of the image blur correction device 200, as viewed from the object side, is defined as an X direction (first direction), an upward direction as a Y direction (second direction), and a direction along the optical axis O as a Z direction.

The state in which the blur correction device 200 is in the reference position indicates a state in which an optical axis Ob of the correction lens 101b coincides with the optical axis O of the optical system 101. In the present embodiment, this state corresponds to the position of the blur correction device 200 in a non-driven state. In each of FIGS. 3A to 3D, the optical axis Ob of the correction lens 101b coincides with the optical axis O of the optical system 101, and hence the reference symbol "Ob" is omitted.

The blur correction device 200 is comprised of a fixed member 201, a movable member 202, a cover 203, a ball group 204, a spring group 205, a first slider 206, a second slider 207, a first vibrator unit 300, a second vibrator unit 400, and a position detection sensor (not shown).

In a central part of the fixed member 201, there is formed an opening for passing light from the correction lens 101b, and an vibrator holding portion 201c for holding the first vibrator unit 300 is formed on a side of the opening in the Y direction. Further, on the object-side surface of the fixed member 201, there are formed three ball receiving portions 201a at equal spaced intervals along the same circumference about the optical axis O. Furthermore, on an outer periphery of the fixed member 201, there are formed two beam-shaped spring hook portions 201b protruding in respective opposite directions along the X direction.

The movable member 202 serves as a lens holding member for holding the correction lens 101b. On an outer periphery of the movable member 202, there are formed three ball receiving portions 202a at equal spaced intervals along the same circumference about the optical axis O in a manner opposed to the respective three ball receiving portions 201a of the fixed member 201 in the optical axis direction. Further, on the outer periphery of the movable member 202, there are formed two beam-shaped spring hook portions 202b protruding in respective opposite directions along the X direction, and a slider holding portion 202c protruding in the Y direction.

The cover 203 is disposed on the object side of the fixed member 201 and is integrally fixed to the same. More specifically, in an assembled state of the image blur correction device 200, the fixed member 201 and the cover 203 serve as respective first and second parts of a holding member for holding the two vibrator units 300 and 400 that drive the movable member 202.

A portion of the cover 203, which is opposed to the slider holding portion 202c of the movable member 202 in the optical axis direction, is formed with a vibrator holding portion 203a for holding the second vibrator unit 400. The ball group 204 is comprised of three spherical balls, and each of the balls is sandwiched between the ball receiving portions 201a and 202a in the optical axis direction.

The spring group 205 is comprised of three tensile coil springs each having hook portions formed at respective opposite ends thereof. One of the hook portions of each of the tensile coil springs is hooked on the spring hook portion 201b and the other is hooked on the spring hook portion 202b. Each of the tensile coil springs of the spring group 205 is expanded in the optical axis direction and has opposite ends thereof fixed, whereby the movable member 202 is urged toward the fixed member 201 in the optical axis direction and is supported on the object side of the fixed member 201 via the ball group 204. Rolling of the balls of the ball group 204 held between the ball receiving portions 201a and 202a enables the movable member 202 to move on the plane orthogonal to the optical axis O. This makes it possible to move the correction lens 101b held by the movable member 202 on the plane orthogonal to the optical axis O to thereby correct image blur of an optical image formed on the image forming surface I of the image pickup device 102.

The first slider 206 as a first driven element has a rectangular parallelepiped shape. The first slider 206 is fixed to the imaging surface side of the slider holding portion 202c such that its longitudinal direction coincides with the X direction and also that it is opposed to the first vibrator unit 300. The second slider 207 as a second driven element has a rectangular parallelepiped shape. The second slider 207 is fixed to the object side of the slider holding portion 202c such that its longitudinal direction coincides with the Y direction and also that it is opposed to the second vibrator unit 400.

The first vibrator unit 300 is held on the object side of the vibrator holding portion 201c such that it is opposed to the first slider 206. The second vibrator unit 400 is held on the imaging surface side of the vibrator holding portion 203a such that it is opposed to the second slider 207. In the present embodiment, the fixed member 201, the cover 203, a base plate 308, referred to hereinafter, of the first vibrator unit 300, and a base plate 408, referred to hereinafter, of the second vibrator unit 400 are integrally joined (fixed) to each other. Therefore, the first vibrator unit 300 and the second vibrator unit 400 are unmovably held on the plane orthogonal to the optical axis O.

The position detection sensor detects a position of the movable member 202 with respect to the fixed member 201 in each of the X and Y directions in a non-contact manner. The position detection sensor is comprised e.g. of a magnet fixed to the movable member 202 and a hall element fixed to the fixed member 201, and detects the magnetic field of the magnet by the hall element to thereby detect the position of the movable member 202 with respect to the fixed member 201. However, this construction of the position detection sensor is not limitative, but the position detection sensor may be configured to include an LED element fixed to the movable member 202 and a one-dimensional PSD element fixed to the fixed member 201, and detect the relative position based on a change in the detected amount of light.

Figure 4A:
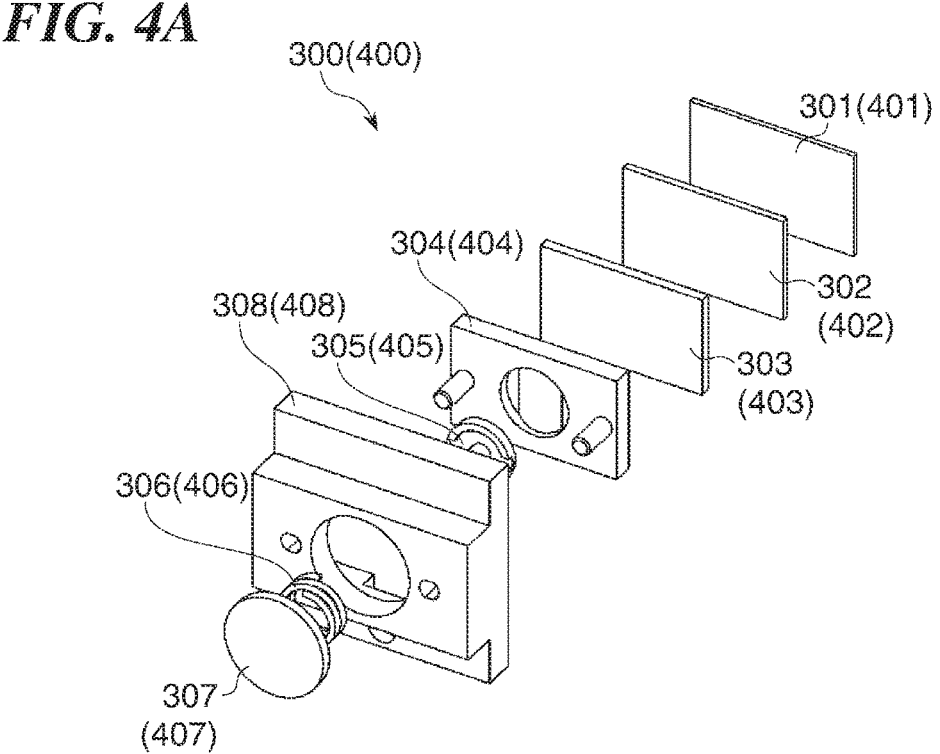
FIG. 4A is an exploded perspective view of a first vibrator unit as a component of the image blur correction device, as viewed from the imaging surface side.
Figure 4B:
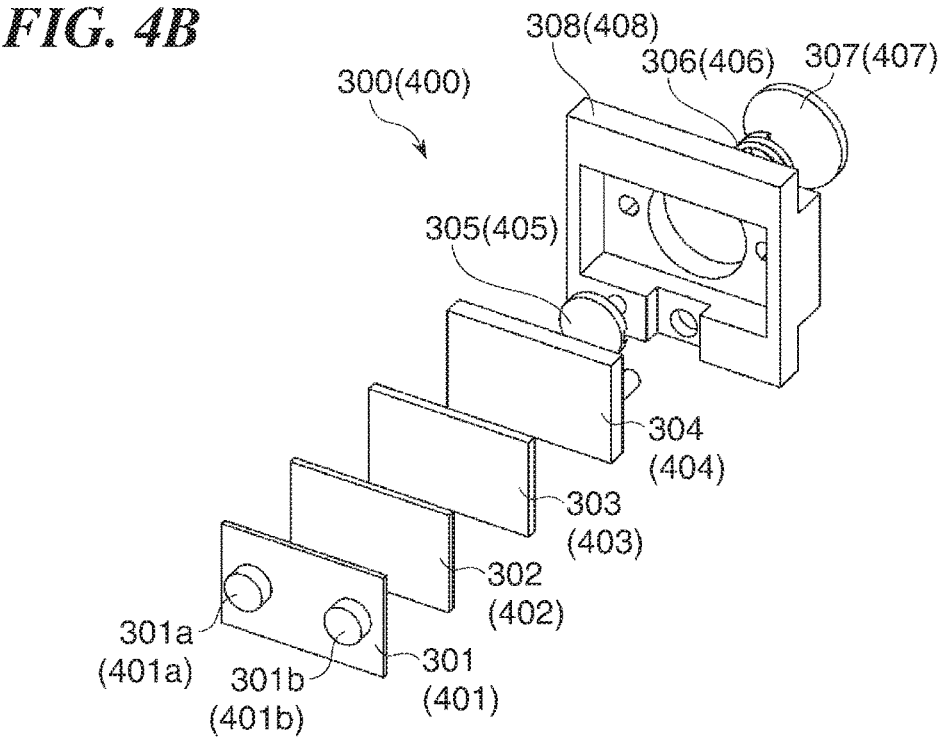
FIG. 4B is an exploded perspective view of the first vibrator unit as viewed from the object side.
Figure 5A:
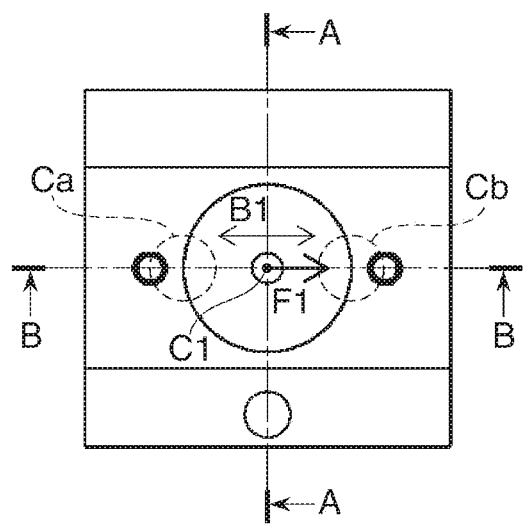
FIG. 5A is a front view of the first vibrator unit.
Figure 5B:
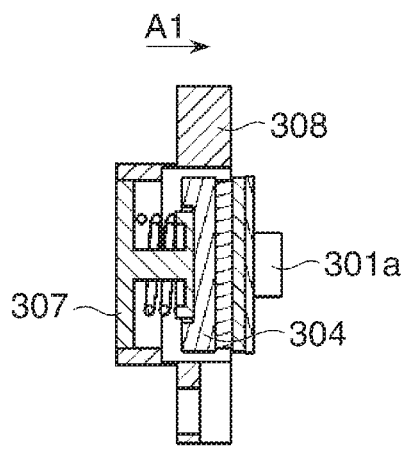
FIG. 5B is a cross-sectional view of the first vibrator unit.
Figure 5C:
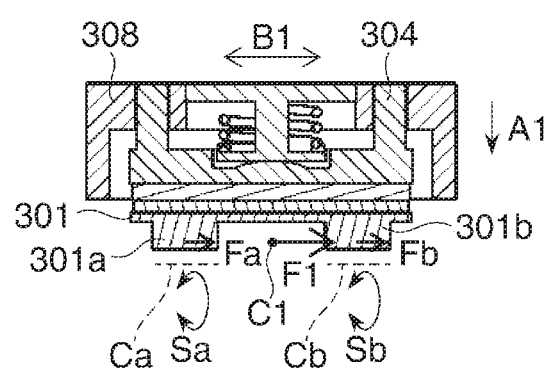
FIG. 5C is another cross-sectional view of the first vibrator unit.

FIG. 4A is an exploded perspective view of the first vibrator unit 300 as viewed from the imaging surface side, and FIG. 4B is an exploded perspective view of the same as viewed from the object side. FIG. 5A is a front view of the first vibrator unit 300. FIG. 5B is a cross-sectional view taken as indicated by arrows A-A in FIG. 5A, and FIG. 5C is a cross-sectional view taken as indicated by arrows B-B in FIG. 5A.

As shown in FIGS. 4A and 4B, the first vibrator unit 300 is comprised of a vibration plate 301, a piezoelectric element 302, an elastic member 303, a pressure plate 304, a pressure spring-holding member 305, a pressure spring 306, a pressure spring base plate 307, and the base plate 308. Note that the first vibrator unit 300 and the second vibrator unit 400 have the same construction and are different in the manner of disposition. For this reason, in FIGS. 4A and 4B, the component parts of the second vibrator unit 400 corresponding to those of the first vibrator unit 300 are denoted by parenthesized reference numerals (401 to 408), respectively.

The vibration plate 301 has a generally rectangular flat plate shape, as viewed in the optical axis direction, and has two pressure contact portions 301a and 301b formed on one surface thereof in a manner longitudinally spaced from each other by a predetermined distance. The piezoelectric element 302 has a generally rectangular flat plate shape, as viewed in the optical axis direction, and is fixed by an adhesive to the opposite surface of the vibration plate 301 from the surface on which the pressure contact portions 301a and 301b are formed.

In the present embodiment, the vibration plate 301, the pressure contact portions 301a and 301b, and the piezoelectric element 302 form a vibrator. The vibrator is designed in a shape that can excite vibration in a vibration mode for causing the extreme ends of the respective pressure contact portions 301a and 301b to perform elliptic motions as indicated by respective arrows Sa and Sb in FIG. 5C, when a voltage having a predetermined frequency is applied to the piezoelectric element 302. The elliptic motions indicated by the respective arrows Sa and Sb are excited within a plane substantially parallel to an imaginary line between the two pressure contact portions 301a and 301b and orthogonal to a plane on which the pressure contact portions 301a and 301b of the vibration plate 301 are formed. Therefore, the first slider 206 held in pressure contact with the pressure contact portions 301a and 301b receives a frictional driving force (thrust force) from the pressure contact portions 301a and 301b performing the elliptic motions and is frictionally driven in a direction along the imaginary line connecting the pressure contact portions 301a and 301b. At this time, it is possible to change the rotational direction and ellipse ratio of each of the elliptic motions indicated by the respective arrows Sa and Sb by changing the frequency, phase or the like of the voltage applied to the piezoelectric element 302, to thereby adjust the magnitude of the thrust force for frictionally driving the first slider 206.

The elastic member 303 is a sheet-like member formed e.g. of rubber and has a generally rectangular shape, as viewed in the optical axis direction. The pressure plate 304 has a generally rectangular shape as viewed in the optical axis direction and is pressed toward the piezoelectric element 302 via the elastic member 303 by receiving an urging force from the pressure spring 306. The elastic member 303 is disposed between the pressure plate 304 and the piezoelectric element 302, whereby it is possible to cause the pressure plate 304 to disperse a pressure force applied to the vibration plate 301, to thereby uniformly press the pressure contact portions 301a and 301b against the first slider 206. For this purpose, it is desirable that the elastic member 303 has a uniform thickness.

The pressure spring 306 is disposed between the pressure spring-holding member 305 and the pressure spring base plate 307. The pressure spring base plate 307 supports one end of the pressure spring 306, and the pressure spring-holding member 305 supports the other end of the pressure spring 306. In this state, a portion of the pressure spring-holding member 305 is fitted in the pressure spring 306. This causes the pressure spring 306 to be stably held between the pressure spring-holding member 305 and the pressure spring base plate 307. The pressure spring 306 can be expanded/contracted between the pressure spring-holding member 305 and the pressure spring base plate 307 in a pressurizing direction (direction indicated by an arrow A1 in FIG. 5B or 5C).

The base plate 308 is joined to the fixed member 201. The base plate 308 holds the pressure spring base plate 307 such that the movement of the pressure spring base plate 307 in the direction A1 is restricted. The vibration plate 301 is urged in the direction A1 by the pressure spring 306, and the pressure contact portions 301a and 301b are held in pressure contact with the first slider 206. This causes the elliptical motions of the respective pressure contact portions 301a and 301b to be excited, as described hereinbefore, whereby the first slider 206 is frictionally driven by the pressure contact portions 301a and 301b.

In the present embodiment, the first slider 206 and the first vibrator unit 300 constitute a first drive section 300A as a vibratory wave motor (vibration actuator). Further, a pressure contact area where the pressure contact portion 301a is held in pressure contact with the first slider 206 is defined as an area Ca, a pressure contact area where the pressure contact portion 301b is held in pressure contact with the first slider 206 is defined as an area Cb, and a center point between the pressure contact areas Ca and Cb is defined as "a center point C1". The first vibrator unit 300 is held by the fixed member 201, and hence the center point C1 is fixed.

Assuming that vibration excited in the vibration plate 301 has generated a driving force Fa at the pressure contact portion 301a and a driving force Fb at the pressure contact portion 301b as shown in FIG. 5C, the driving force Fa and the driving force Fb have the same magnitude. A resultant force of the driving forces Fa and Fb generated between the first vibrator unit 300 and the first slider 206 acts on the center point C1, and the magnitude of the resultant force can be regarded as that of a driving force F1 as the sum of the driving force Fa and the driving force Fb.

The driving force F1 acts in a direction indicated by an arrow B1 in FIGS. 3A and 5C. At this time, the first slider 206 is fixed to the movable member 202 holding the correction lens 101b, and hence the first drive section 300A applies the driving force F1 acting in the direction B1 (i.e. the X direction in FIGS. 2A and 2B) to the correction lens 101b via the movable member 202. Note that the direction in which the driving force F1 acts is different depending on the direction of rotation in elliptical motion of each of the pressure contact portions 301a and 301b.

The second vibrator unit 400 has the same construction as that of the first vibrator unit 300. The second vibrator unit 400 is comprised of vibration plate 401, a piezoelectric element 402, an elastic member 403, a pressure plate 404, a pressure spring-holding member 405, a pressure spring 406, a pressure spring base plate 407, and the base plate 408, and the vibration plate 401 has pressure contact portions 401a and 401b formed thereon. The base plate 408 is joined to the cover 203. As shown in FIGS. 4A and 4B, the vibration plate 401, for example, corresponds to the vibration plate 301, and such correspondence applies to each of the other components of the vibration plates 301 and 401. Therefore, description of the components is omitted.

In the present embodiment, the second slider 207 and the second vibrator unit 400 constitute a second drive section 400A as a vibratory wave motor. Further, similar to the first drive section 300A, a center point between pressure contact areas where the respective pressure contact portions 401a and 401b are held in pressure contact with the second slider 207 is defined as "a center point C2". The second vibrator unit 400 is held by the cover 203, and hence the center point C2 is fixed.

It can be considered that a driving force F2 (see FIGS. 7A to 7C) as a resultant force of driving forces generated between the second vibrator unit 400 and the second slider 207 acts on the center point C2. The driving force F2 acts in a direction indicated by an arrow B2 in FIG. 3A. In this state, the second slider 207 is fixed to the movable member 202 holding the correction lens 101b, and hence the second drive section 400A applies the driving force F2 acting in the direction B2 to the correction lens 101b via the movable member 202. Note that the direction in which the driving force F2 acts is different depending on the direction of rotation in elliptical motion of each of the pressure contact portions 401a and 401b.

In the present embodiment, each of the first drive section 300A and the second drive section 400A is a vibratory wave motor (vibration actuator) that drives the slider by vibration excited in the pressure plate. Therefore, the first drive section. 300A and the second drive section 400A can be configured to have the same construction, and hence commonality can be provided between components to thereby achieve simplification of the construction and cost reduction.

A description will be given, with reference to FIGS. 3A to 3D, of the positional relationship between the first drive section 300A and the second drive section 400A in a state in which the image blur correction device 200 is in the reference position. As described hereinbefore, the first slider 206 is fixed to the imaging surface side of the slider holding portion 202c in a manner opposed to the first vibrator unit 300. On the other hand, the second slider 207 is fixed to the object side of the slider holding portion 202c in a manner opposed to the second vibrator unit 400. Thus, the first vibrator unit 300, the first slider 206, the second slider 207, and the second vibrator unit 400 are arranged in a manner at least partially overlapping each other when viewed in the optical axis direction.

When viewed in the optical axis direction, the first drive section 300A and the second drive section 400A are positioned in respective areas D1 and D2 indicated by broken lines (see FIG. 3A). Note that in FIG. 3A, the areas D1 and D2 overlap each other. At this time, the center point C1 is located in the area D2 (see FIGS. 3A and 3D). Therefore, when viewed in the optical axis direction, the vibration plate 301, the center point C1, and the second drive section 400A overlap each other. Further, the center point C1, the vibration plate 401, and the second slider 207 also overlap each other when viewed in the optical axis direction. Similarly, when viewed in the optical axis direction, the center point C2 is located in the area D1 (see FIGS. 3A and 3C). Therefore, when viewed in the optical axis direction, the vibration plate 401, the center point C2, and the first drive section 300A overlap each other. Further, the center point C2, the vibration plate 301, and the first slider 206 also overlap each other when viewed in the optical axis direction.

Further, when viewed in the optical axis direction, the vibration plate 301, the center point C1, and the center point C2 overlap each other (see FIG. 3A). The center point C1 is also a point of application of driving force by the first drive section 300A, and the center point C2 is also a point of application of driving force by the second drive section 400A. In other words, the center between the contact pressure areas for the first slider 206 (i.e. the center point C1) and the point of application of driving force by the second drive section 400A (i.e. the center point C2) overlap each other. At the same time, the center between the contact pressure areas for the second slider 207 (i.e. the center point C2) and the point of application of driving force by the first drive section 300A (i.e. the center point C1) overlap each other when viewed in the optical axis direction.

The long sides of the image forming surface I of the image pickup device 102 are parallel to the X direction, and the short sides of the same are parallel to the Y direction (see FIG. 3A). The first drive section 300A and the second drive section 400A are disposed on a side of the correction lens 101b in the Y direction. Assuming that an area of projection of the correction lens 101b in the Y direction is an area E (see FIG. 3A), both the center point C1 and the center point C2 are contained in the area E. Assuming that the movable member 202 is in the reference position, the center points C1 and C2 overlap the optical axis O as the center of the optical system 101 in the Y direction parallel to the short sides of the image forming surface I, when viewed in the optical axis direction.

The direction B1 as a direction in which acts the driving force generated by the first drive section 300A coincides with the X direction orthogonal to the optical axis O, and the direction B2 as a direction in which acts the driving force generated by the second drive section 400A coincides with the Y direction orthogonal to the optical axis C. Therefore, the movable member 202 is driven by the first drive section 300A and the second drive section 400A in the X and Y directions, respectively, within the plane orthogonal to the optical axis O. Note that the position detection sensor detects the amount of displacement of the movable member 202 from the reference position in each of the direction B1 (X direction) and the direction B2 (Y direction).

Figure 6A:
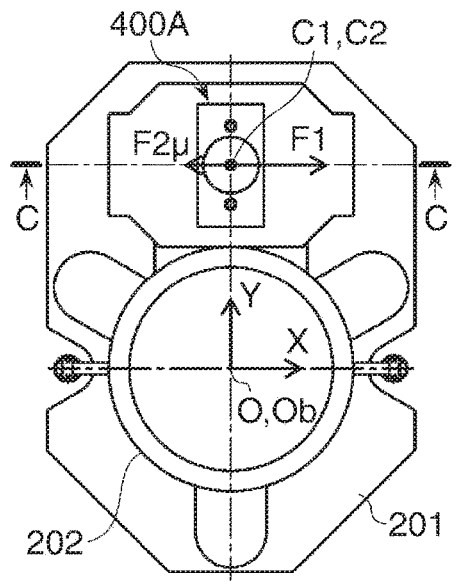
FIG. 6A is a front view useful in explaining a first operation of the image blur correction device.
Figure 6C:
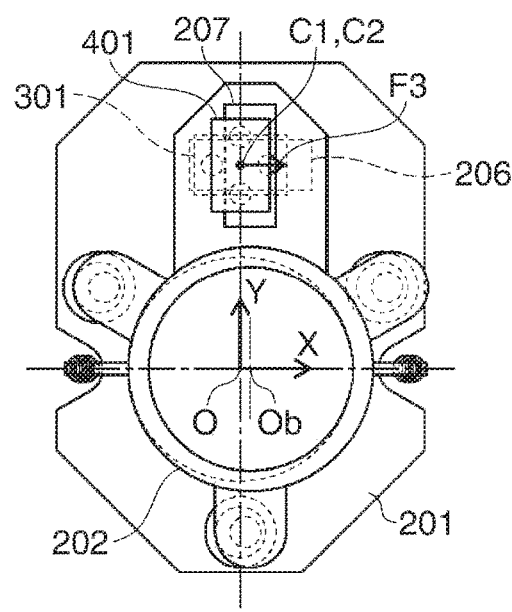
FIG. 6C is another front view useful in explaining the first operation of the image blur correction device.
Figure 6B:
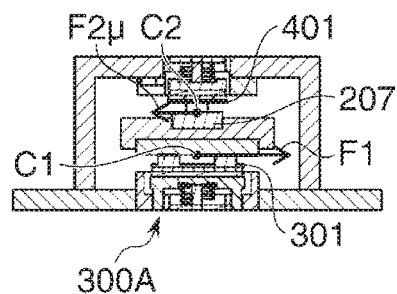
FIG. 6B is a cross-sectional view useful in explaining the first operation of the image blur correction device.

FIGS. 6A and 6C are front views useful in explaining a first operation of the image blur correction device 200, and FIG. 6B is a cross-sectional view taken as indicated by arrows C-C in FIG. 6A. Let it be assumed that the first vibrator unit 300 is driven based on a detection signal from the position detection sensor, whereby vibration excited in the vibration plate 301 causes the driving force F1 in the direction to act on the center point C1. When the driving force F1 starts to move the movable member 202 in the K direction, a frictional force F2μ is generated between the vibration plate 401 (the pressure contact portions 401a and 401b) and the second slider 207. The frictional force F2μ can be regarded to act on the center point C2, and a direction in which the frictional force F2μ acts is a −X direction opposite to the direction in which the driving force F1 acts.

Here, not only the frictional force F2μ, but also rolling frictional forces between the ball group 204 and the ball receiving portions 201*a* and 202*a* and sliding frictional forces between the spring group 205 and the spring hook portions 201*b* and 202*b* are generated. Further, a spring force is generated by a change in length of each spring of the spring group 205. However, these forces are smaller than the driving force F1 and the frictional force F2μ, and hence they are ignored.

As a consequence, a driving force F3 in the X-direction (see FIG. 6C) which is a difference between the driving force F1 and the frictional force F2μ acts on the movable member 202 to move the same in the X direction. When the position detection sensor detects that the movable member 202 has been moved by a predetermined distance, the driving of the first vibrator unit 300 is stopped, whereby the movable member 202 becomes stationary. Note that the magnitude of the frictional force F2μ may be reduced by driving the second vibrator unit 400 during driving of the first vibrator unit 300 such that thrust-up vibration acting in the pressure contact direction (i.e. the optical axis direction) is generated in the pressure contact portions 401*a* and 401*b*.

Figure 7A:
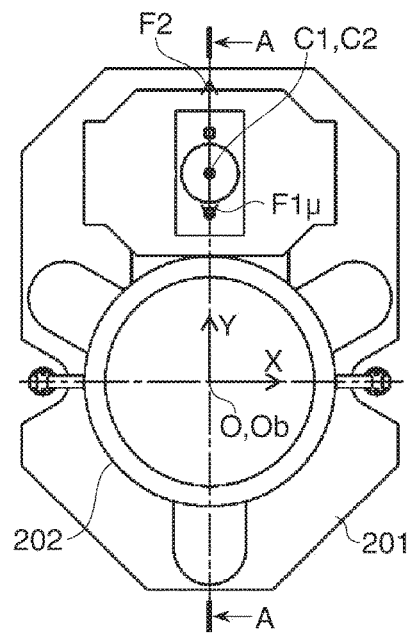
FIG. 7A is a front view useful in explaining a second operation of the image blur correction device.
Figure 7C:
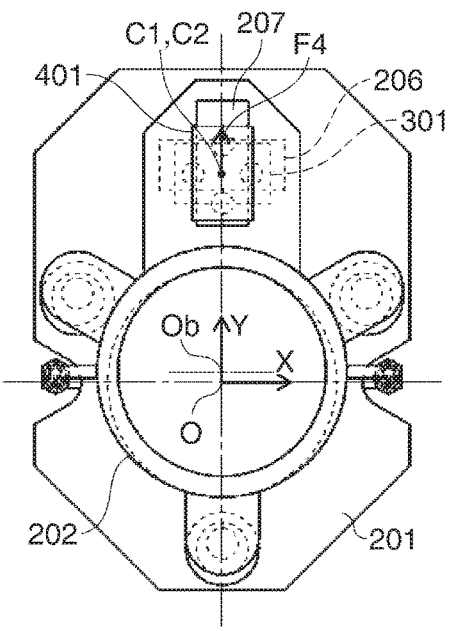
FIG. 7C is another front view useful in explaining the second operation of the image blur correction device.
Figure 7B:
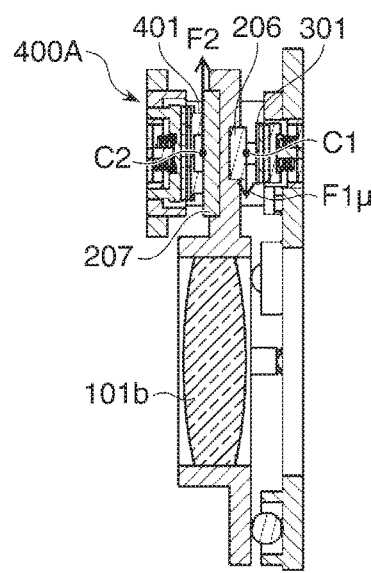
FIG. 7B is a cross-sectional view useful in explaining the second operation of the image blur correction device.

FIGS. 7A and 7C are front views useful in explaining a second operation of the image blur correction device 200, and FIG. 7B is a cross-sectional view taken as indicated by arrows A-A in FIG. 7A. Let it be assumed that the second vibrator unit 400 is driven based on a detection signal from the position detection sensor, whereby vibration excited in the vibration plate 401 causes the driving force F2 in the Y direction to act on the center point C2. Similar to the description given with reference to FIGS. 6A to 6C, a driving force F4 in the Y direction which is a difference between the driving force F2 and a frictional force F1μ generated between the vibration plate 301 (the pressure contact portions 301*a* and 301*b*) and the first slider 206 acts on the movable member 202 to move the same in the Y direction. At this time, the magnitude of the frictional force F1μ may be reduced by causing thrust-up vibration in the pressure contact direction to be generated in the vibration plate 301.

As described above with reference to FIGS. 6A to 6C and 7A to 7C, the image blur correction device 200 moves the removable member 202 in the X and Y directions by the respective predetermined distances to thereby move the optical axis Pb of the correction lens 101*b* with respect to the optical axis O of the optical system. 101 within the plane orthogonal to the optical axis O. Blurs caused in the X-direction and Y direction by an external force externally applied to the optical system 101 are detected by the position detection sensor, and the correction lens 101*b* (the movable member 202) is moved in the X direction and/or the Y direction within the plane orthogonal to the optical axis O according to a detection signal from the position detection sensor. Thus, it is possible to correct image blur of an optical image formed on the image forming surface I by moving the optical image, to thereby prevent degradation of the image quality of a photographed image.

Next, the image blur correction device 200 of the present embodiment will be compared with conventional image blur correction devices. First, an image blur correction device 200α having the same construction as that of the image blur correction device 200 except for the arrangement, as viewed in the optical axis direction, of the first drive section 300A and the second drive section 400A will be taken up as a first related art.

Figure 8A:
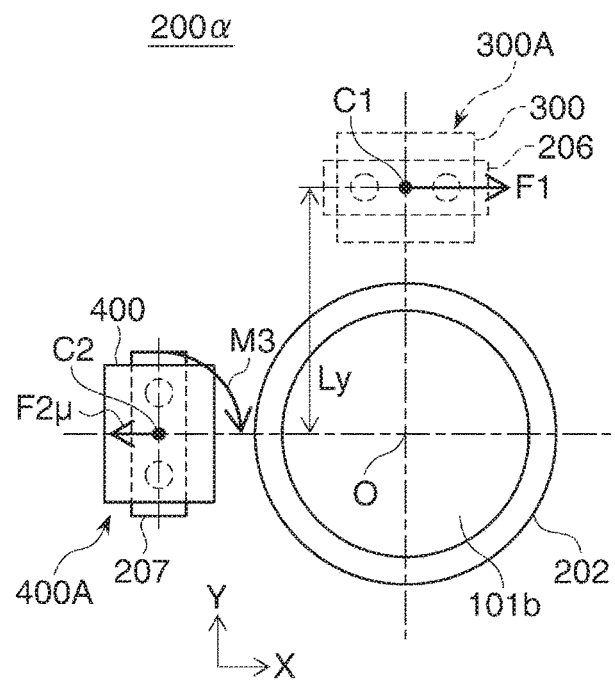
FIG. 8A is a front view useful in explaining a driven state of a first drive section of an image blur correction device according to a first related art.
Figure 8B:
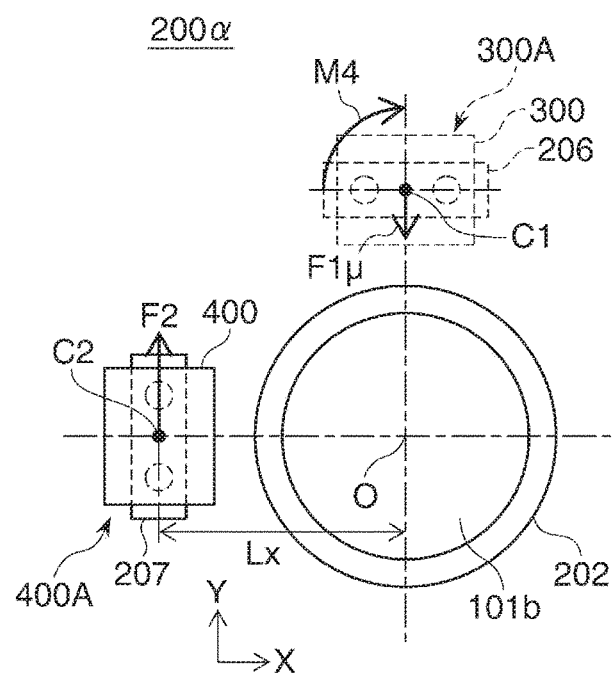
FIG. 8B is a front view useful in explaining a driven state of a second drive section of the image blur correction device shown in FIG. 8A.

FIG. 8A is a front view of the image blur correction device 200α according to the first related art. FIG. 8A is a view useful in explaining a driven state of the first drive section 300A. FIG. 8B is a front view of the image blur correction device 200α according to the first related art, which is useful in explaining a driven state of the second drive section 400A. In FIGS. 8A and 8B, only the correction lens 101*b*, the movable member 202, the first drive section 300A, and the second drive section 400A are shown.

FIG. 8A schematically shows a state in which vibration excited in the vibration plate 301 by driving the first drive section 300A causes the driving force F1 in the X direction to act on the center point C1.

In the image blur correction device 200α, the first drive section 300A is disposed on a side of the optical axis O in the Y direction, and the second drive section 400A is disposed on a side of the same in the −X direction, as viewed in the optical axis direction. Therefore, when viewed in the optical axis direction, the center point C1 does not overlap the second drive section 400A, and the center point C2 does not overlap the first drive section 300A, either. In this case, the frictional force F2μ in the −X direction that can be regarded to act on the center point C2 is generated between the vibration plate 401 and the second slider 207.

In the image blur correction device 200α, the center point C1 and the center point C2 are spaced from each other by a distance Ly in the Y direction. For this reason, not only a driving force which is a difference between the driving force F1 and the frictional force F2μ, but also a moment M3 of force about a rotational axis parallel to the optical axis O acts on the movable member 202. This moment M3 of force causes the movable member 202 to perform not only movement of in the +X direction, but also movement in the Y direction and rotation about the rotational axis parallel to the optical axis O, which are unnecessary for blur correction. As a consequence, it is impossible to obtain an excellent image blur correction result.

FIG. 8B schematically shows a state in which vibration excited in the vibration plate 401 by driving the second drive section 400A causes the driving force F2 in the Y direction to act on the center point C2. In the image blur correction device 200α, the center point C2 and the center point C1 are spaced from each other by a distance Lx in the X direction. For this reason, not only a driving force which is a difference between the driving force F2 and the frictional force F1μ, but also a moment M4 of force about a rotational axis parallel to the optical axis O acts on the movable member 202. This moment M4 of force causes the movable member 202 to perform not only movement in the +Y direction, but also movement in the X direction and rotation about the rotational axis parallel to the optical axis O, which are unnecessary for blur correction. As a consequence, it is impossible to obtain an excellent image blur correction result.

In the image blur correction device 200α according to the first related art, the movable member 202 is caused to perform motion unnecessary for blur correction as described above, which degrades the accuracy of image blur correction of an optical image formed on the image forming surface I, so that the image quality of a photographed image is degraded. Further, the accuracy in position detection by the position detection sensor is degraded due to rotation of the movable member 202, which further degrades the accuracy in image blur correction.

Next, the image blur correction device 200 of the present embodiment will be compared with an image blur correction device according to a second related art. The image blur correction device 200β has the same configuration as that of the image blur correction device 200 except for the arrangement, as viewed in the optical axis direction, of the first drive section 300A and the second drive section 400A. The image blur correction device 200β is distinguished from the image blur correction device 200α by the respective positions, as viewed in the optical axis direction, of the first and second drive sections 300A and 400A.

Figure 9A:
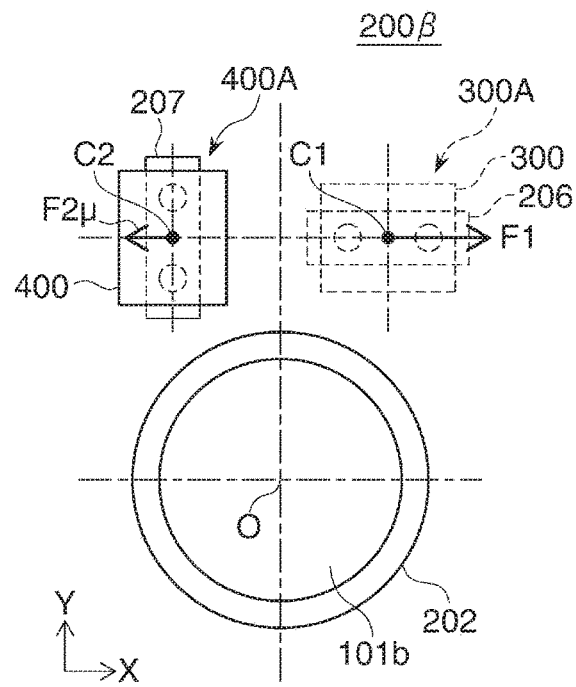
FIG. 9A is a front view useful in explaining a driven state of a first drive section of an image blur correction device according to a second related art.
Figure 9B:
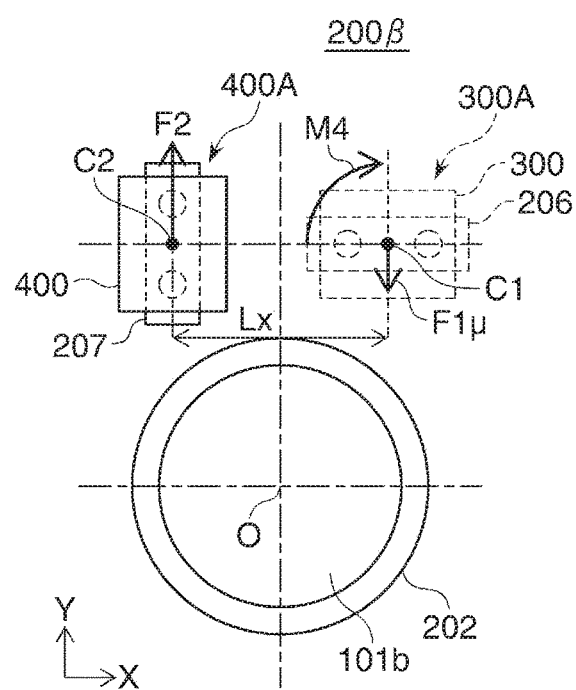
FIG. 9B is a front view useful in explaining a driven state of a second drive section of the image blur correction device according to the second related art.

FIG. 9A is a front view of the image blur correction device 200β according to the second related art, which is useful in explaining a driven state of the first drive section 300A. FIG. 9B is a front view of the image blur correction device 200β, which is useful in explaining a driven state of the second drive section 400A. In FIGS. 9A and 9P, only the correction lens 101b, the movable member 202, the first drive section 300A, and the second drive section 400A are shown.

FIG. 9A schematically shows a state in which vibration excited in the vibration plate 301 by driving the first drive section 300A causes the driving force F1 in the X direction to act on the center point C1.

In the image blur correction device 200β, the first drive section 300A is disposed on a side of the optical axis O in the +Y direction and also on a side of the same in the +X direction, while the second drive section 400A is disposed on a side of the optical axis O in the +Y directional and also on a side of the same in the −X-direction, as viewed in the optical axis direction. Therefore, in the image blur correction device 200β as well, when viewed in the optical axis direction, the center point C1 does not overlap the second drive section 400A, and the center point. C2 does not overlap the first drive section 300A, either. In this case, the position of the center point C1 in the Y direction and that of the center point C2 in the Y direction coincide with each other (i.e. a line connecting between the center point C1 and the center point C2 is orthogonal to the Y direction). Therefore, differently from the image blur correction device 200α, the moment M3 of force about the rotational axis parallel to the optical axis O is not generated.

FIG. 9B schematically shows a state in which vibration excited in the vibration plate 401 by driving the second drive section 400A causes the driving force F2 in the Y direction to act on the center point C2. In this case, the center point C1 and the center point C2 are spaced by from each other by the distance Lx in the X direction, and hence, similar to the image blur correction device 200α, the frictional force F1μ generated at the center point C1 causes the moment M4 of force about the rotational axis parallel to the optical axis O to act on the movable member 202. This moment M4 of force causes the movable member 202 to perform not only movement in the direction, but also movement in the X direction and rotation about the rotational axis parallel to the optical axis O, which are unnecessary for blur correction. As a consequence, it is impossible to obtain an excellent image blur correction result. As described above, the image blur correction device 200β according to the second related art suffers from the same problem as the image blur correction device 200α according to the first related art does.

Figure 10A:
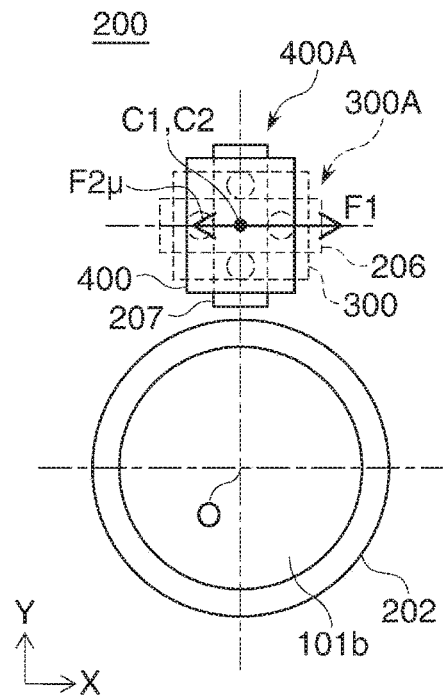
FIG. 10A is a front view useful in explaining a driven state of a first drive section of the image blur correction device according to the first embodiment.
Figure 10B:
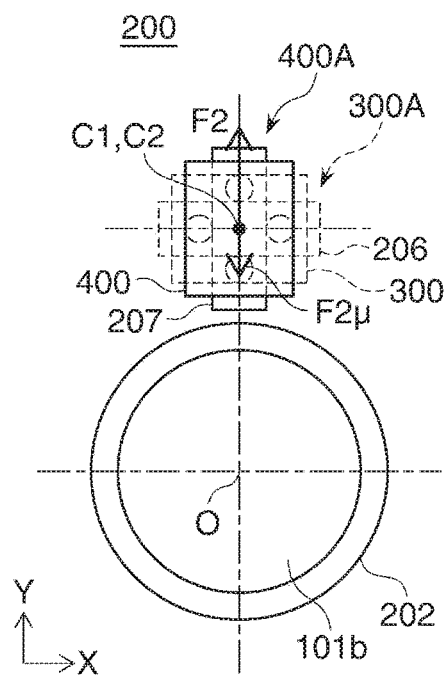
FIG. 10B is a front view useful in explaining a driven state of a second drive section of the image blur correction device according to the first embodiment.

A description will be given hereinafter, with reference to FIGS. 10A and 10B, how the image blur correction device 200 of the present embodiment is free from the above-described problem that the image blur correction devices 200α and 200β according to the respective first and second related arts suffer from FIG. 10A is a front view of the image blur correction device 200 according to the present embodiment, which is useful in explaining a driven state of the first drive section 300A. FIG. 10B is a front view of the image blur correction device 200, which is useful in explaining a driven state of the second drive section 400A. In FIGS. 10A and 10B, only the correction lens 101b, the movable member 202, the first drive section 300A, and the second drive section 400A are shown.

In the image blur correction device 200, the first drive section 300A and the second drive section 400A are disposed in an overlapping manner on a side of the optical axis O in the Y directional, as viewed in the optical axis direction. Further, when viewed in the optical axis direction, the center point C1 and the second drive section 400A overlap each other, and the center point C2 and the first drive section 300A also overlap each other. The vibration plate 301 and the vibration plate 401 are held (fixed) such that relative motion therebetween within the plane orthogonal to the optical axis O is prevented, so that even when the movable member 202 moves within the plane orthogonal to the optical axis O, the position of the center point C1 and that of the center point C2 always coincide with each other when viewed in the optical axis direction.

Let it be assumed, as shown in FIG. 10A, that vibration excited in the vibration plate 301 by driving the first drive section 300A causes the driving force F1 in the X direction to act on the center point C1. In this case, since the center point C1 and the center point C2 are in the same position in the Y direction, the moment M3 of force about the rotational axis parallel to the optical axis O is not generated. Therefore, the movable member 202 is moved only in the X direction by the driving force in the X-direction which is a difference between the driving force F1 and the frictional force F2μ.

Further, let it be assumed, as shown in FIG. 10B, that vibration excited in the vibration plate 401 by driving the second drives section 400A causes the driving force F2 in the Y direction to act on the center point C2. In this case, since the center point C2 and the center point C1 are in the same position in the X direction, the moment M4 of force about the rotational axis parallel to the optical axis O is not generated. Therefore, the movable member 202 is moved only in the Y direction by the driving force in the Y direction which is a difference between the driving force F2 and the frictional force F1μ.

As described above, in the image blur correction device 200, even when the first drive section 300A and the second drive section 400A are driven, no moment of force about the rotational axis parallel to the optical axis O acts on the movable member 202. Therefore, it is possible to prevent rotation of the movable member 202, which is unnecessary for image blur correction, to thereby correct image blur of an optical image formed on the image forming surface I with high accuracy and thereby maintain the image quality of a photographed image at high level. Further, it is possible to maintain a high accuracy of detection of the position of the movable member 202 by the position detection sensor, which also makes it possible to maintain a high accuracy of image blur correction. Furthermore, differently from the image blur correction devices according to the prior arts, the image blur correction device 200 does not require a mechanism for preventing the movable member 202 from performing motions other than the motions in the X direction and Y direction which are necessary for blur correction, so that it is possible to avoid complication of the construction and reduce the number of component parts.

Figure 11:
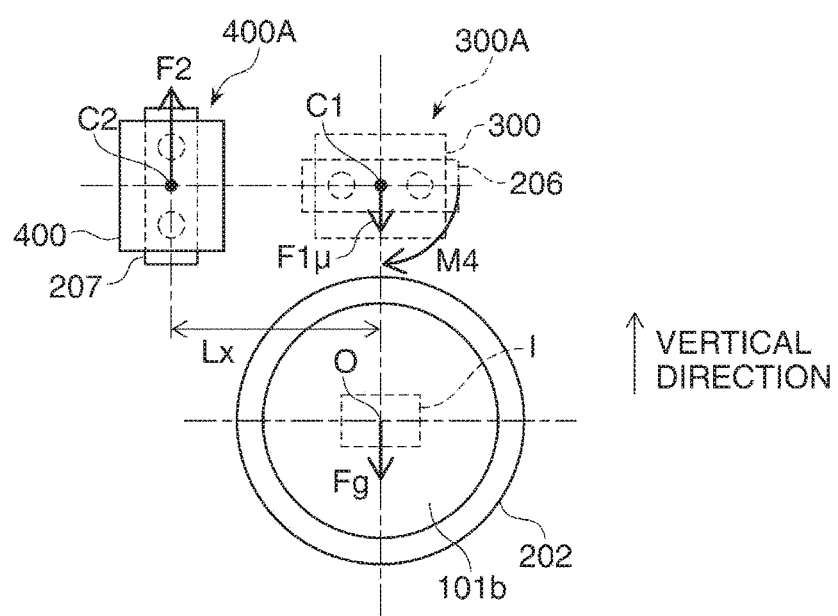
FIG. 11 is a front view useful in explaining rotation of a movable member which is caused in an image blur correction device according to a third related art, assuming that a direction in which the movable member is driven by a second drive section is a vertical direction.

Next, a comparison will be made between an image blur correction device according to a third related art and the image blur correction device 200. FIG. 11 is a front view of the image blur correction device 200γ according to the third related art, which is useful in explaining a driven state of the second drive section 400A. In FIG. 11, only the correction lens 101b, the movable member 202, the first drive section 300A, and the second drive section 400A are shown.

The image blur correction device 200γ has the same construction as that of the image blur correction device 200 except for the arrangement of the first drive section 300A and the second drive section 400A as viewed in the optical axis direction. In the image blur correction device 200γ, when viewed in the optical axis direction, the center point C1 does not overlap the second drive section 400A, and the center point C2 does not overlap the first drive section 300A, either. Further, in the Y direction parallel to the short sides of the image forming surface I, the center point C1 overlaps the optical axis O, but the center point C2 does not. The center point C1 and the center point C2 are spaced from each other by the distance Lx in the X direction.

Let it be assumed that vibration is excited in the vibration plate 401 while holding image blur correction device 200γ in a state in which the direction of driving of the movable member 202 by the second vibrator unit 400 coincides with the vertical direction, whereby the driving force F2 in the vertical direction is caused to act on the center point C2. In this case, gravity causes a gravitational force Fg to act downward in the vertical direction on the center of gravity of the entire movable member 200 (including the correction lens 101b, the first slider 206, and the second slider 207). The entire movable member 202 has a shape generally rotation-symmetrical about the optical axis O, and hence the center of gravity of the entire movable member 202 can be regarded to coincide with the optical axis O.

In this case, the frictional force F1μ generated at the center point C1 and the gravitational force Fg cause the moment M4 of force about the rotational axis parallel to the optical axis O to act on the movable member 202. This moment M4 of force causes the movable member 202 to perform not only movement in the vertical direction, but also movement in the horizontal direction and rotation about the rotational axis parallel to the optical axis O, which are unnecessary for blur correction. In other words, similar to the image blur correction devices 200α and 200β, the image blur correction device 200γ also suffers from the problem that the accuracy of image blur correction is degraded to cause degradation of the image quality of a photographed image and the problem that the accuracy of position detection by the position detection sensor is degraded.

Figure 12:
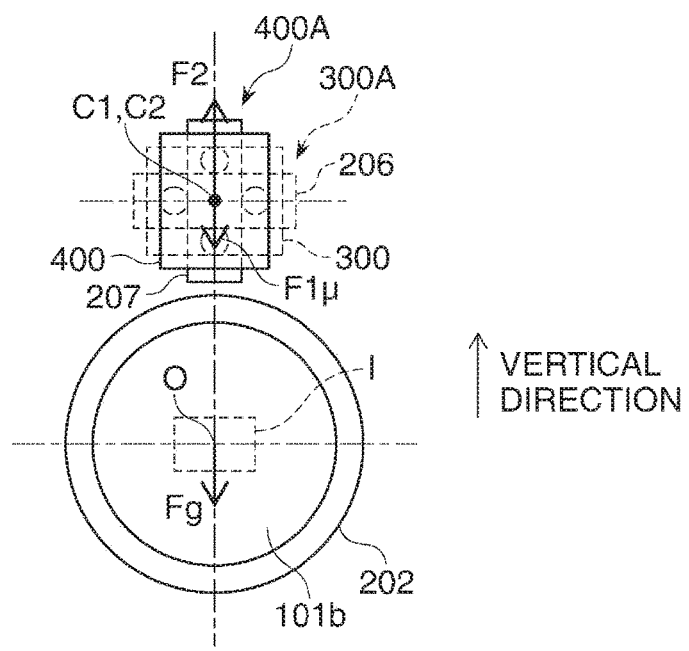
FIG. 12 is a front view useful in explaining an effect of preventing occurrence of rotation of a movable member, assuming that a direction in which the movable member is driven by the second drive section of the image blur correction device according to the first embodiment.

FIG. 12 is a front view of the image blur correction device 200. Similar to FIG. 11, FIG. 12 is a view useful in explaining a driven state of the second drive section 400A with the direction of driving of the movable member 202 by the second vibrator unit 400 coinciding with the vertical direction. Let it be assumed that vibration is excited in the vibration plate 401 whereby the driving force F2 in the vertical direction is caused to act on the center point C2. In this case, in the image blur correction device 200, the center point C2 receiving the driving force F2, the center point C1 receiving the frictional force F1μ, and the optical axis O receiving the gravitational force Fg overlap each other when viewed in the vertical direction. For this reason, the moment of force about the rotational axis parallel to the optical axis O is not generated, and hence rotation of the movable member 202 is not caused. This makes it possible to avoid occurrence of the problem that the image blur correction device 200γ according to the third related art suffers from, i.e. degradation of the image quality of a photographed image due to degradation of the accuracy of image blur correction and degradation of the accuracy of position detection by the position detection sensor. Note that although in the image blur correction device 200, the first drive section 300A and the second drive section 400A are disposed on the side of the correction lens 101b in the +Y direction, it is possible to obtain the same advantageous effect even when the first drive section 300A and the second drive section 400A are disposed on the side of the correction lens 101b in the −Y direction.

Incidentally, in general, the image pickup device 102 has a rectangular shape and the image forming surface I is also formed into a rectangular shape. An image pickup apparatus is generally held up for shooting such that the horizontal line becomes parallel to the short or long sides of the image forming surface I. In particular, moving image shooting is generally performed in a state in which the horizontal line is held parallel to the long sides of the image forming surface I, i.e. in a state shown in FIG. 12, where the Y direction coincides with the vertical direction. Therefore, according to the image blur correction device 200, it is possible to markedly obtain the advantageous effects of preventing degradation of the image quality of a photographed image particularly in a shooting posture that is frequently taken.

Figure 13A:
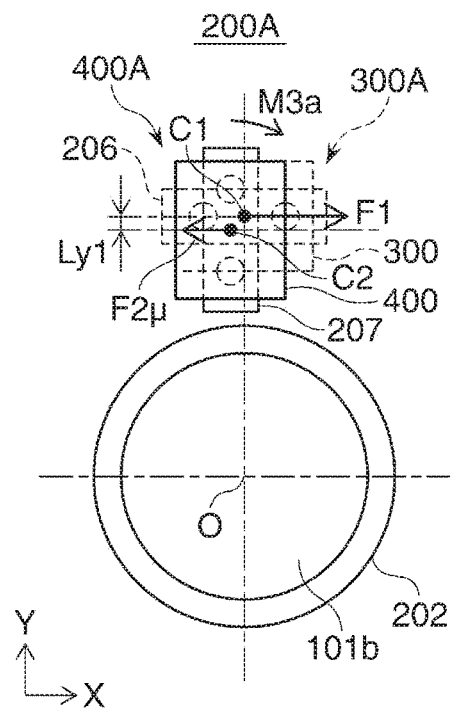
FIG. 13A is a front view useful in explaining a driven state of a first drive section of a variation of the image blur correction device according to the first embodiment.
Figure 13B:
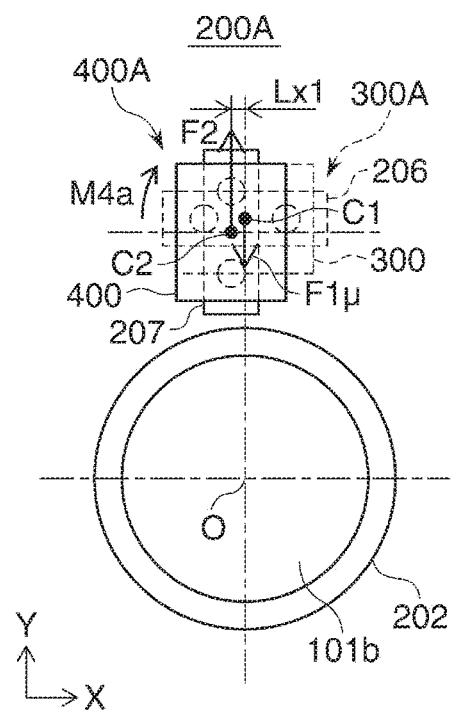
FIG. 13B is a front view useful in explaining a driven state of a second drive section of the variation of the image blur correction device.

Next, a description will be given of a variation of the above-described image blur correction device 200. FIGS. 13A and 13B are front views of an image blur correction device 200A as the variation of the image blur correction device 200. In FIGS. 13A and 13B, only the correction lens 101b, the movable member 202, the first drive section 300A, and the second drive section 400A are shown.

In the image blur correction device 200A, when viewed in the optical axis direction, the center point C1 and the center point C2 are spaced from each other by a distance Ly1 in the Y direction and by a distance Lx1 in the X direction. In this respect, the image blur correction device 200A is distinguished from the image blur correction device 200 in which the center point C1 and the center point C2 are in the same position in both the Y direction and the X direction. However, the image blur correction device 200A is similar to the image blur correction device 200 in that when viewed in the optical axis direction, the center point C1 and the second drive section 400A overlap each other, and the center point C2 and the first drive section 300A also overlap each other.

FIG. 13A is a view useful in explaining a force that acts on the movable member 202 when vibration is excited in the vibration plate 301 by driving the first drive section 300A to thereby cause the driving force F1 in the X direction to act on the center point C1. In the image blur correction device 200A, the center point C1 and the center point C2 are spaced from each other by the distance Ly1 in the Y direction. For this reason, similar to the case described with reference to FIG. 8A, the frictional force F2μ generated at the center point C2 causes a moment M3a of force about the rotational axis parallel to the optical axis O to act on the movable member 202. However, the distance Ly1 is shorter than the distance Ly between the center point C1 and the center point C2 of the first related art (i.e. the image blur correction device 200α), and hence the moment M3a of force is made much smaller than the moment M3 of force generated in the case of the first related art.

FIG. 13B is a view useful in explaining a force that acts on the movable member 202 when vibration is excited in the vibration plate 401 by driving the second drive section 400A to thereby cause the driving force F2 in the Y direction to act on the center point C2. In the image blur correction device 200A, the center point C1 and the center point C2 are spaced from each other by the distance Lx1 in the X direction. However, the distance Lx1 is shorter than the distance Lx between the center point C1 and the center point C2 of the first related art (i.e. the image blur correction device 200α).

For this reason, similar to the case described with reference to FIG. 8B, the frictional force F1μ generated at the center point C1 causes a moment M4a of force about the rotational axis parallel to the optical axis O to act on the movable member 202. However, the moment M4a of force is made much smaller than the moment M4 of force generated in the case of the first related art.

As described above, in the image blur correction device 200A, it is possible to reduce a moment of force about the rotational axis parallel to the optical axis O, which is caused by a frictional force generated in one drive section when the other drive section is driven, and hence it is possible to minimize movement, which is unnecessary for blur correction, of the movable member 202. Thus, compared with the related arts, even with the simplified construction, the image blur correction device 200A makes it possible to maintain a higher image quality of a photographed image by maintaining the accuracy of image blur correction for an optical image formed on the image forming surface I at a higher level and maintain the accuracy of position detection by the image detection sensor at a higher level.

Figure 14A:
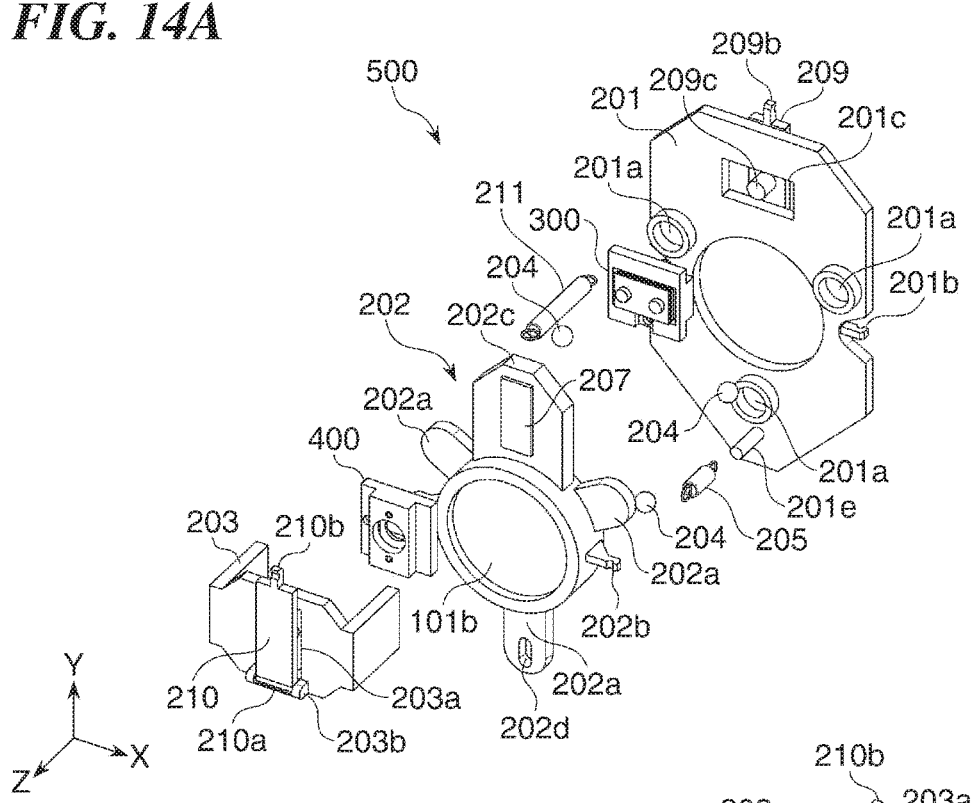
FIG. 14A is an exploded perspective view of an image blur correction device according to a second embodiment of the invention, as viewed from the object side.
Figure 14B:
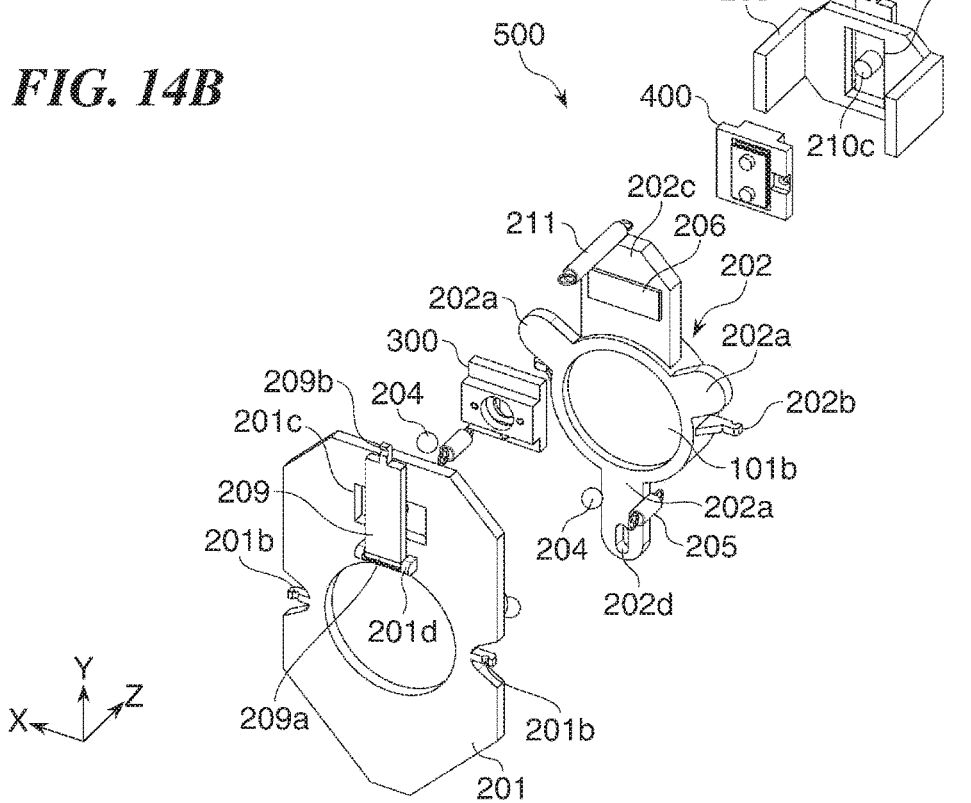
FIG. 14B is an exploded perspective view of the image blur correction device shown in FIG. 14A, as viewed from the imaging surface side.
Figure 15A:
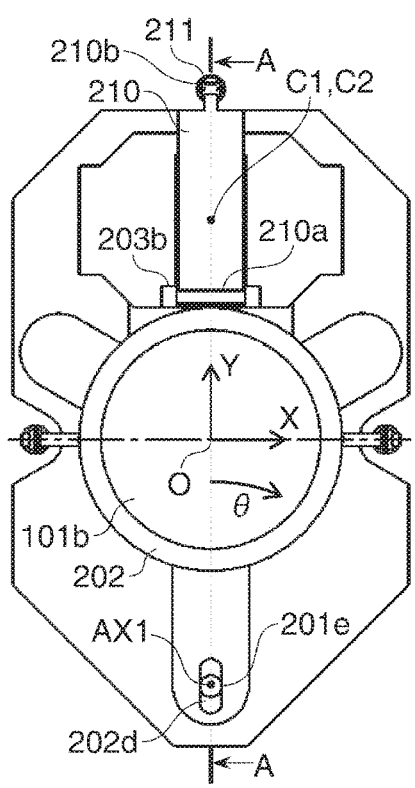
FIG. 15A is a front view of the image blur correction device according to the second embodiment in a reference position.
Figure 15B:
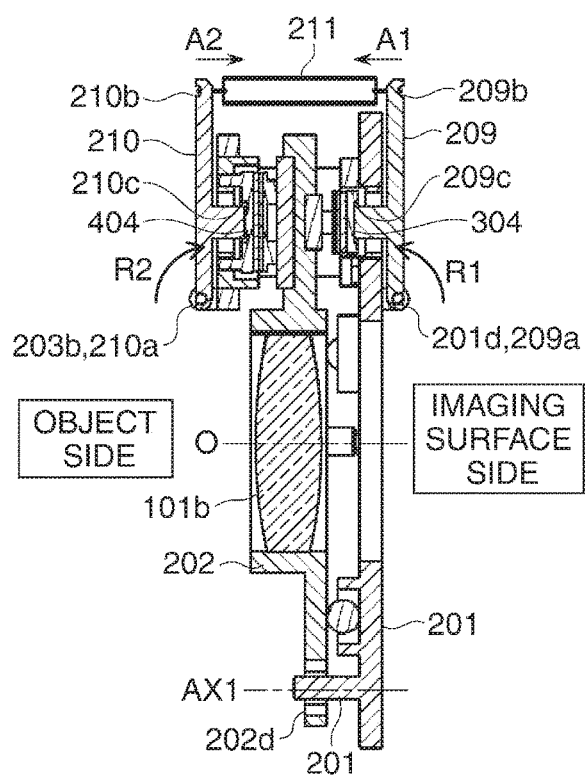
FIG. 15B is a cross-sectional view of the image blur correction device shown in FIG. 15A in the reference position.

Next, a description will be given of a second embodiment of the invention. FIG. 14A is an exploded perspective view of an image blur correction device 500 according to the second embodiment, as viewed from the object side, while FIG. 14B is an exploded perspective view of the image blur correction device 500 as viewed from the imaging surface side. FIG. 15A is a front view of the image blur correction device 500 in the reference position. FIG. 15B is a cross-sectional view taken as indicated by arrows A-A in FIG. 15A. Note that components of the image blur correction device 500 corresponding to those of the image blur correction device 200 of the first embodiment are denoted by the same reference numerals, and description thereof is omitted.

The image blur correction device 500 is distinguished from the image blur correction device 200 of the first embodiment by the construction of the pressure means for pressure contact between the pressure plate and the sliders and the construction of the support means for supporting the movable member on the fixed member. In the following, the two different points will be described.

The first vibrator unit 300 of the image blur correction device 500 is not provided with the pressure spring-holding member 305, the pressure spring 306, and the pressure spring base plate 307, and the second vibrator unit 400 is not provided with the pressure spring-holding member 405, the pressure spring 406, and the pressure spring base plate 407. On the other hand, the image blur correction device 500 is provided with a first pressure member 209, a second pressure member 210, and a pressure spring 211 instead.

On the imaging surface-side surface of the fixed member 201, there is provided a pressure member holding portion 201d having a shaft parallel to the X direction. The first pressure member 209 is disposed on the imaging surface-side surface of the fixed member 201. The first pressure member 209 has one end thereof formed with an engagement portion 209a for engagement with the pressure member holding portion 201d and the other end thereof formed with a spring hook portion 209b. The first pressure member 209 is supported on the fixed member 201 by engagement between the pressure member holding portion 201d and the engagement portion 209a in a manner rotatable about the shaft of the pressure member holding portion 201d.

Note that the direction of rotation of the first pressure member 209 is a direction along a ZY plane, which is indicated by an arrow R1 in FIG. 15B, or an opposite direction thereto. In the first pressure member 209, a pressure portion 209c is formed between the engagement portion 209a and the spring hook portion 209b, and the pressure portion 209c is disposed such that it can be brought into contact with the pressure plate 304 of the first vibration unit 300 through the vibrator holding portion 201c which is an opening.

On the object-side surface of the cover 203, there is provided a pressure member holding portion 203b having a shaft parallel to the X direction. The second pressure member 210 is disposed on the object-side surface of the cover 203. The second pressure member 210 has one end thereof formed with an engagement portion 210a for engagement with the pressure member holding portion 203b and the other end thereof formed with a spring hook portion 210b. The second pressure member 210 is supported on the cover 203 by engagement between the pressure member holding portion 203b and the engagement portion 210a in a manner rotatable about the shaft of the pressure member holding portion 203b.

Note that the direction of rotation of the second pressure member 210 is a direction along the ZY plane, which is indicated by an arrow R2 in FIG. 15B, or an opposite direction thereto. In the second pressure member 210, a pressure portion 210c is formed between the engagement portion 210a and the spring hook portion 210b, and the pressure portion 210c is disposed such that it can be brought into contact with the pressure plate 404 of the second vibration unit 400 through the vibrator holding portion 203a which is an opening.

The pressure spring 211 is a tensile coil spring having opposite ends thereof formed with respective hook portions, one of which is hooked to the spring hook portion 209b, and the other to the spring hook portion 210b, in an expanded state of the pressure spring 211. As shown in FIG. 15B, the spring force of the pressure spring 211 applies a force acting in a direction A1 parallel to the optical axis O to the spring hook portion 209b, and the first pressure member 209 receives a force acting to cause the same to rotate in the direction R1, whereby the pressure portion 209c urges the pressure plate 304 in the direction A1. This brings the vibration plate 301 of the first vibrator unit 300 into pressure contact with the first slider 206. Similarly, the spring force of the pressure spring 211 applies a force acting in a direction A2 parallel to the optical axis O to the spring hook portion 210b, and the second pressure member 210 receives a force acting to cause the same to rotate in the direction R2, whereby the pressure portion 210c urges the pressure plate 404 in the direction A2. This brings the vibration plate 401 of the second vibrator unit 400 into pressure contact with the second slider 207.

As described above, the pressure spring 211 generates the urging force for pulling the first pressure member 209 and the second pressure member 210 toward each other in the optical axis direction to thereby sandwich the first slider 206 and the second slider 207 by the pressure plates 301 and 401. In other words, the pressure means for bringing the vibration plate 301 (i.e. the pressure contact portions 301a and 301b) into pressure contact with the first slider 206 and the pressure means for bringing the vibration plate 401 (i.e. the pressure contact portions 401a and 401b) into pressure contact with the second slider 207 are integrated and commonality of the components is provided. This makes it possible to reduce the number of components and achieve simplification of the construction and cost reduction. Further, in the image blur correction device 500, the first drive section 300A and the second drive section 400A overlap each other when viewed in the optical axis direction, so that the spring hook portions 209b and 210b can be disposed closer to each other. Therefore, space efficiency obtained by integrating the pressure means for the first and second drive section 300A and 400A by the use of the pressure spring 211 is high, which makes it possible to achieve size reduction.

Next, a description will be given of support means for supporting the movable member 202 in the image blur correction device 500. On the object-side surface of the fixed member 201, in an area opposite to the vibrator holding portion 201c across the opening for passing light having passed through the correction lens 101b, there is provided a shaft-lake pin 201e which protrudes toward the object side and has an axis AX1 parallel to the optical axis O in the center. The movable member 202 has a slot-like guide portion 202d formed through the movable member 202 in the optical axis direction at a location opposed to the pin 201e in the optical axis direction. The slot-like guide portion 202d longitudinally extends in the Y direction. The pin 201e and the guide portion 202d are slidably engaged with each other.

Figure 16A:
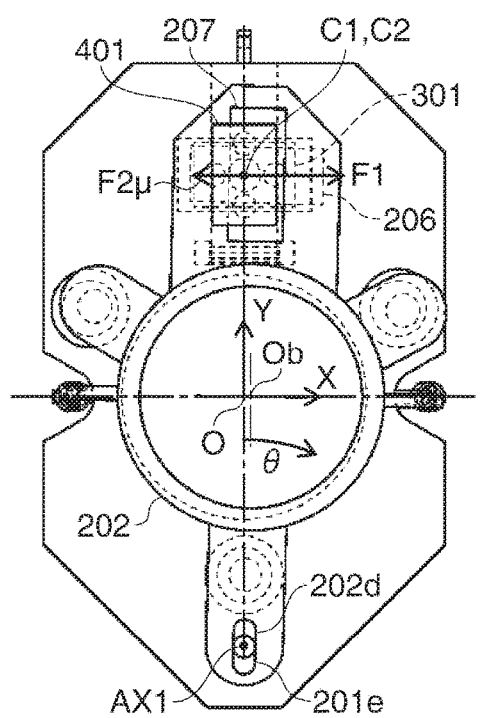
FIG. 16A is a front view useful in explaining operation performed by the image blur correction device of the second embodiment when a first drive section thereof is driven.
Figure 16B:
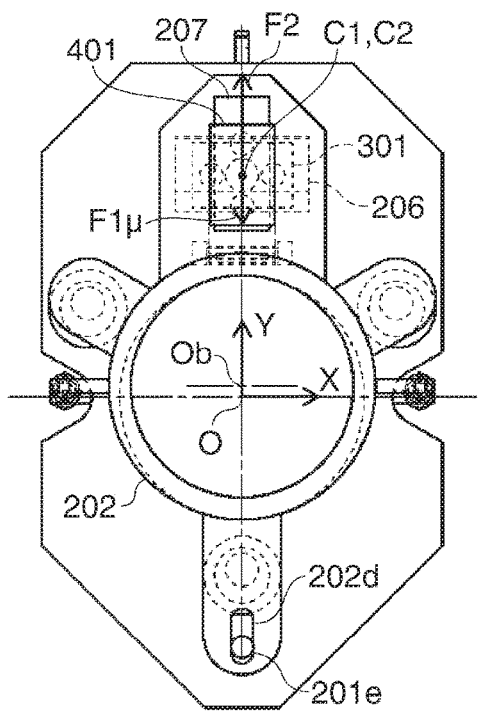
FIG. 16B is a front view useful in explaining operation performed by the image blur correction device of the second embodiment when a second drive section thereof is driven.

FIGS. 16A and 16B are front views useful in explaining operation of the image blur correction device 500. In FIGS. 16A and 16B, representation of some components is omitted. FIG. 16A schematically shows a state in which vibration excited in the vibration plate 301 by driving the first drive section 300A causes the driving force F1 in the X direction to act on the center point C1. A driving force in the X-direction as a difference between the driving force F1 and the frictional force F2μ acts on the movable member 202 to cause the guide portion 202d to rotate about the pin 201e in a direction θ, whereby the movable member 202 is caused to rotate about the axis AX1 in the direction θ with respect to the fixed member 201.

FIG. 16B schematically shows a state in which vibration excited in the vibration plate 401 by driving the second drive section 400A causes the driving force F2 in the Y direction to act on the center point C2. In this case, a driving force in the Y direction as a difference between the driving force F2 and the frictional force F1μ acts on the movable member 202. At this time, the center point C2, the optical axis O, and the pin 201e are in respective positions overlapping each other when viewed in the Y direction, and the pin 201e can move along the guide portion 202d in the Y direction. Therefore, the movable member 202 moves in the Y direction with respect to the fixed member 201.

As described above, the pin 201e and the guide portion 202d function as a guide section for guiding the correction lens 101b which is integrally provided in the movable member 202, in a manner allowing the correction lens 101b to move in the Y direction and rotate about the axis AX1 in the direction θ, within the plane orthogonal to the optical axis O.

In this case, when the amount of rotation in the direction θ is sufficiently small, the rotational movement of the movable member 202 in the direction θ can be regarded as movement in a direction substantially parallel to the X direction, i.e. linear motion in the X direction. Therefore, in the image blur correction device 500 as well, it is possible to linearly move the movable member 202 in the X or Y direction without causing movement unnecessary for blur correction. This enables the image blur correction device 500 to prevent degradation of the image quality of a photographed image due to degradation of the accuracy of blur correction and degradation of the accuracy of position detection by the position detection sensor.

Next, relationships between the attitude of the image pickup apparatus and the effect of image blur correction will be described. Specifically, a comparison is made between the image blur correction device 200 of the first embodiment and the image blur correction device 500 of the second embodiment, each in a state where the lens barrel (image pickup apparatus) is rotated through 90 degrees such that the direction of driving of the movable member 202 by the first drive section 300A coincides with the vertical direction. Note that, in a case where an image photographed by the image pickup apparatus which drives the movable member 202 in the horizontal direction is landscape (longer on the horizontal side), if the image pickup apparatus is rotated through 90 degrees such that the image pickup apparatus drives the movable member 202 in the vertical direction, an image photographed thereby is portrait (longer on the vertical side) Here, let it be assumed that vibration excited in the vibration plate 301 causes the driving force F1 in the vertical direction to act on the center point C1. Therefore, movement of the movable member 202 of the image blur correction device 500 in the direction θ can be regarded as movement in the vertical direction.

Figure 17A:
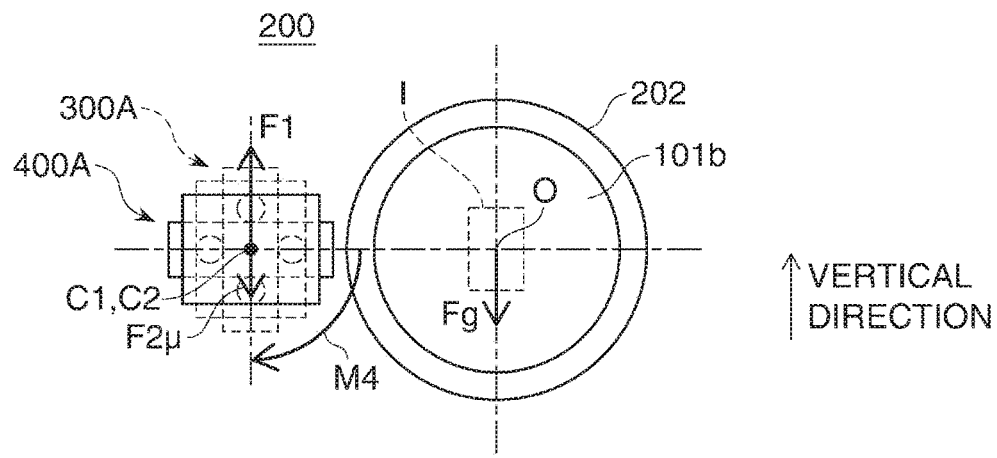
FIG. 17A is a front view useful in explaining movement of the movable member of the image blur correction device according to the first embodiment, assuming that a direction of driving of the movable member by the first drive section is a vertical direction.
Figure 17B:
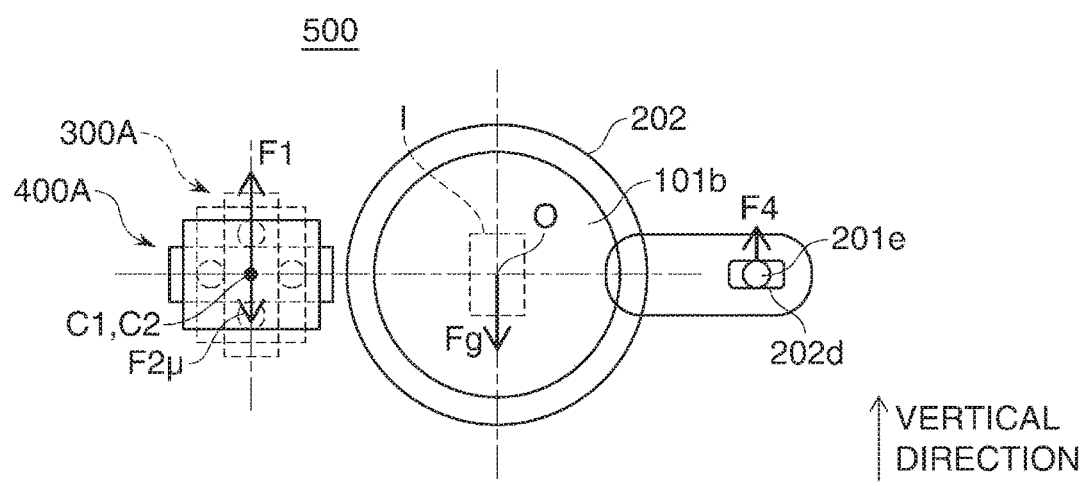
FIG. 17B is a front view useful in explaining movement of the movable member of the image blur correction device according to the second embodiment, assuming that a direction of driving of the movable member by the first drive section is a vertical direction.

FIG. 17A is a front view schematically showing a state in which vibration excited in the vibration plate 301 of the image blur correction device 200, of which the direction of driving of the movable member 202 by the first drive section 300A is caused to coincide with the vertical direction, causes the driving force F1 in the vertical direction to act on the center point C1. FIG. 17B is a front view schematically showing a state in which vibration excited in the vibration plate 301 of the image blur correction device 500, of which the direction of driving of the movable member 202 by the first drive section 300A is caused to coincide with the vertical direction, causes the driving force F1 in the vertical direction to act on the center point C1. In each of FIGS. 17A and 17B, only the correction lens 101b, the movable member 202, the first drive section 300A, and the second drive section 400A are shown.

In each of the image blur correction devices 200 and 500, the vertical driving force as a difference between the driving force F1 and the frictional force F2μ acts on the movable member 202, and gravity causes a gravitational force Fg to act downward in the vertical direction on the center of gravity of the entire movable member 200 including the correction lens 101b. Similar to the case described with reference to FIG. 11, the gravity center of the entire movable member 202 can be regarded to coincide with the position of the optical axis O.

In the case of the image blur correction device 200, the gravitational force Fg causes the moment M4 of force about the rotational axis parallel to the optical axis O to act on the movable member 202. This moment M4 of force can cause the movable member 202 to perform not only movement in the vertical direction, but also movement in the horizontal direction and rotation about the rotational axis parallel to the optical axis O, which are unnecessary for blur correction.

On the other hand, in the case of the image blur correction device 500, the reaction force F4 upward in the vertical direction, which cancels the moment caused by the gravitational force Fg, acts on the guide portion 202d via the pin 201e. Therefore, the moment M4 of force about the rotational axis parallel to the optical axis O does not act on the movable member 202, and the movable member 202 is not caused to perform rotational movement unnecessary for blur correction.

Insofar as the movement of the movable member 202 in a case where the direction of driving of the movable member 202 by the first drive section 300A coincides with the horizontal direction is concerned, it is possible to quote the description given with reference to FIGS. 16A and 16B. Therefore, according to the image blur correction device 600, irrespective of whether the direction of driving of the movable member 202 by the first drive section 300A coincides with the horizontal direction or the vertical direction, it is possible to prevent degradation of the image quality of a photographed image and degradation of the accuracy of position detection by the position detection sensor. Note that in the image blur correction device 500, the pin 201e and the guide portion 202d are disposed on an opposite side of the correction lens 101b from the first drive section 300A and the second drive section 400A, as viewed in the optical axis direction. This prevents the reaction force that cancels the gravitational force Fg from being unnecessarily increased, which makes it possible to maintain the mechanical strength of the pin 201e and the guide portion 202d to thereby enhance reliability.

Figure 18A:
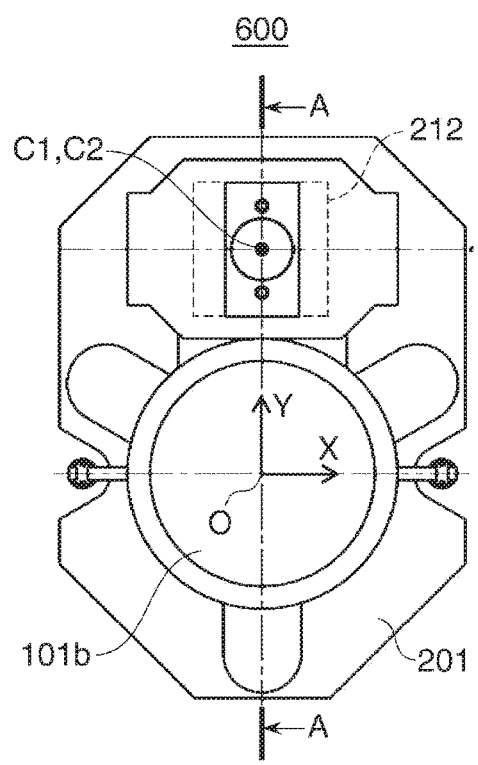
FIG. 18A is a front view of an image blur correction device according to a third embodiment of the invention.
Figure 18B:
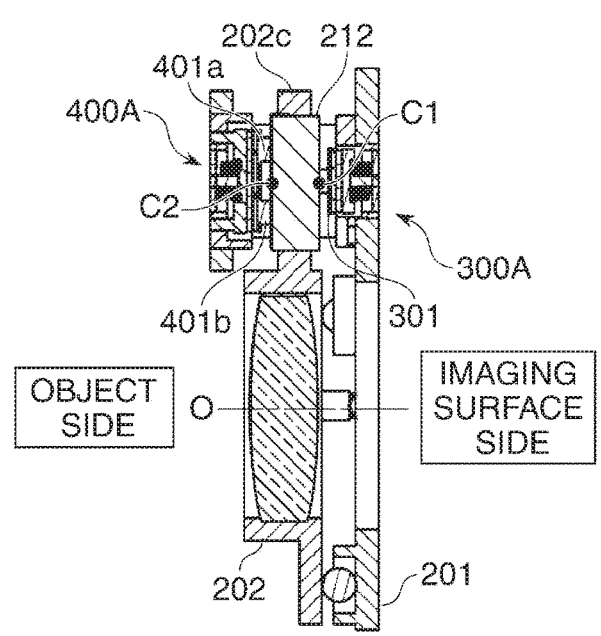
FIG. 18B is a cross-sectional view of the image blur correction device shown in FIG. 18A.

FIG. 18A is a front view of an image blur correction device 600 according to a third embodiment of the invention, as viewed from the object side, which shows a state of the image blur correction device 600 being in the reference position. FIG. 18B is a cross-sectional view taken as indicated by arrows A-A in FIG. 18A. Note that components of the image blur correction device 600 corresponding to those of the image blur correction device 200 according to the first embodiment are denoted by the same reference numerals, and description thereof is omitted. The image blur correction device 600 is distinguished from the image blur correction device 200 according to the first embodiment by the construction of a slider. In the following, this different point will be described.

The slider 212 provided in the image blur correction device 600 is held by the slider holding portion 202c of the movable member 202. The imaging surface-side surface of the slider 212 is opposed to the first vibrator unit 300, and the object-side surface of the same is opposed to the second vibrator unit 400. The vibration plate 301 is held in pressure contact with the imaging surface-side surface of the slider 212, and the vibration plate 401 is held in pressure contact with the object surface-side surface of the slider 212. In other words, it can be considered that the slider 212 is formed by integrating the first and second sliders 206 and 207 provided in the image blur correction device 200 of the first embodiment into a single member. By thus forming the slider 212 as a common component for common use between the first drive section 300A and the second drive section 400A, it is possible to reduce the number of component parts, and thereby achieve simplification of the construction and cost reduction.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

For example, although in the first embodiment, the first slider 206 and the second slider 207 are provided on the movable member 202 and the position of the first vibrator unit 300 and that of the second vibrator unit 400 are fixed, it is possible to provide the first vibrator unit 300 and the second vibrator unit 400 on the movable member 202 and fix the first slider 206 and the second slider 207 in an unmovable manner. In such a variation as well, the vibration plate 301 and the vibration plate 401 do not move relative to each other within the plane orthogonal to the optical axis O, so that it is possible to obtain the same advantageous effects as provided by the first embodiment.

Further, although in the above-described embodiments, the correction lens 101b for image blur correction is used as a correction optical element, this is not limitative, but an image pickup device or a prism may be driven instead. Furthermore, although each of the first drive section 300A and the second drive section 400A is formed as a vibratory wave motor, it is possible to form one of the first drive section 300A and the second drive section 400A as a vibratory wave motor and the other as a voice coil motor.

This application claims the benefit of Japanese Patent Application No. 2015-158278 filed Aug. 10, 2015 which is hereby incorporated by reference herein in its entirety.

What is claimed is:

1. An image blur correction device comprising:
a correction optical element,
a first drive section configured to include a first vibrator in which predetermined vibration is excited and a first slider being in contact with said first vibrator and to move said correction optical element in a first direction orthogonal to a direction of are optical axis of the correction optical element; and
a second drive section configured to include a second vibrator in which predetermined vibration is excited and a second slider being in contact with said second vibrator and to move said correction optical element in a second direction orthogonal to the direction of the optical axis,
wherein when viewed in the optical axis direction, said first drive section and said second drive section at least partially overlap each other and a center point of the area of contact between said first vibrator and said first slider and a center point of the area of contact between said second vibrator and said second slider overlap each other.

2. The image blur correction device according to claim 1, wherein said first vibrator and said second vibrator are held by a single holding member so as to prevent said first vibrator and said second vibrator from moving in a direction orthogonal to the optical axis direction.

3. The image blur correction device according to claim 2, wherein said first vibrator is held by a first portion of said single holding member and said second vibrator is held by a second portion of said single holding member, and
wherein a movable member holding said correction optical element is disposed between said first portion and said second portion.

4. The image blur correction device according to claim 3, comprising a first pressure member provided on said first portion and held in contact with said first vibrator,
a second pressure member provided on said second portion and held in contact with said second vibrator, and
an urging unit configured to pull said first pressure member and said second pressure member toward each other in the optical axis direction to thereby bring said first vibrator into pressure contact with said first slider and said second vibrator into pressure contact with said second slider.

5. The image blur correction device according to claim 3, further comprising a guide portion causing said single holding member and said movable member to be engaged with each other such that said movable member can rotate with respect to said single holding member, and configured to allow said movable member to rotate with respect to said single holding member in the second direction, and wherein a rotational direction in a range where said movable member can rotate about said guide portion is substantially parallel to the first direction.

6. The image blur correction device according to claim 5, wherein said guide portion is disposed on an opposite side of the correction optical element from the first drive section, as viewed in the optical axis direction.

7. The image blur correction device according to claim 1, wherein said first slider and said second slider are each formed by the same member.

8. The image blur correction device according to claim 1, wherein the first direction is orthogonal to the second direction.

9. The image blue correction device according to claim 1, wherein the correction optical element is a lens, a prism, or an image pickup device.

10. A lens barrel including an image blur correction device,
wherein the image blur correction device comprises:
a correction optical element;
a first drive ion configured to include a first vibrator in which predetermined vibration is excited and a first slider being in contact with said first vibrator and to move said correction optical element in a first direction orthogonal to a direction of an optical axis of the correction optical element; and
a second drive section configured to include a second vibrator in which predetermined vibration is excited and second slider being in contact with said second vibrator and to move said correction optical element in a second direction orthogonal to the direction of the optical axis,
wherein when viewed in the optical axis direction, said first drive section and said second drive section at least partially overlap each other and a center point of the area of contact between said first vibrator and said first slider and a center point of the area of contact between said second vibrator and said second slider overlap each other, and
wherein the correction optical element is an image blur correction lens.

11. An image pickup apparatus including:
a lens barrel provided with a image blur correction device, and
an image pickup device having a rectangular image forming surface on which a light flux passing through the lens barrel forms an image,
wherein the image blur correction device comprises:
a correction optical element;
a first drive section configured to include a first vibrator in which predetermined vibration is excited and a first slider being in contact with said first vibrator and to move said correction optical element in a first direction orthogonal to a direction of an optical axis of the correction optical element; and
a second drive section configured to include a second vibrator in which predetermined vibration is excited and a second slider being in contact with said second vibrator and to move said correction optical element in a second direction orthogonal to the direction of the optical axis,
wherein when viewed in the optical axis direction, said first drive section and said second drive section at least partially overlap each other and a center point of the area of contact between said first vibrator and said first slider and a center point of the area of contact between said second vibrator and said second slider overlap each other, and
wherein the correction optical element is an image blur correction lens.

12. The image pickup apparatus is according to claim 11, wherein in a direction parallel to one side of the image forming surface, as viewed in the optical axis direction, a center point of an area of contact between said first vibrator and said first slider and the correction optical element overlap each other.

* * * * *